US012567130B2

(12) United States Patent
Gehrke et al.

(10) Patent No.: US 12,567,130 B2
(45) Date of Patent: Mar. 3, 2026

(54) REAL-TIME BLIND REGISTRATION OF DISPARATE VIDEO IMAGE STREAMS

(71) Applicant: Ford Global Technologies, LLC, Dearborn, MI (US)

(72) Inventors: Mark Gehrke, Ypsilanti, MI (US); David Hiskens, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

(21) Appl. No.: 18/333,600

(22) Filed: Jun. 13, 2023

(65) Prior Publication Data

US 2024/0420285 A1 Dec. 19, 2024

(51) Int. Cl.

| | |
|---|---|
| *G06T 3/18* | (2024.01) |
| *G06T 3/40* | (2006.01) |
| *G06T 5/50* | (2006.01) |
| *G06T 5/80* | (2024.01) |
| *G06T 7/38* | (2017.01) |
| *G06T 7/80* | (2017.01) |

(52) U.S. Cl.
CPC ................. *G06T 5/50* (2013.01); *G06T 3/18* (2024.01); *G06T 3/40* (2013.01); *G06T 5/80* (2024.01); *G06T 7/38* (2017.01); *G06T 7/80* (2017.01); *G06T 2207/10016* (2013.01); *G06T 2207/20212* (2013.01); *G06T 2207/30252* (2013.01)

(58) Field of Classification Search
CPC . G06T 2207/10016; G06T 2207/20212; G06T 2207/30252; G06T 3/18; G06T 3/40; G06T 5/50; G06T 5/80; G06T 7/38; G06T 7/80; H04N 23/671; H04N 23/80; H04N 23/951; H04N 5/2628; H04N 7/181
See application file for complete search history.

(56) References Cited

U.S. PATENT DOCUMENTS

| | | | |
|---|---|---|---|
| 7,269,299 | B2 | 9/2007 | Schroeder |
| 7,924,312 | B2 | 4/2011 | Packard |
| 8,605,972 | B2 | 12/2013 | Yu et al. |
| 8,971,664 | B2 | 3/2015 | VanDame |

(Continued)

FOREIGN PATENT DOCUMENTS

| | | |
|---|---|---|
| CN | 112381714 A | 2/2021 |
| CN | 113888437 A | 1/2022 |

(Continued)

OTHER PUBLICATIONS

Brown, "A Survey of Image Registration Techniques", ACM Computing Surveys. vol. 24. No. 4, Dec. 1992.

(Continued)

*Primary Examiner* — Amandeep Saini
*Assistant Examiner* — Caroline Tabancay Duffy
(74) *Attorney, Agent, or Firm* — Frank Lollo; Brooks Kushman P.C.

(57) ABSTRACT

A first image of a scene captured by a first camera is received. The first image is resized to have an instantaneous field of view (IFoV) corresponding to the IFoV of a second image of the scene captured by a second camera. A distortion-corrected resized first image is constructed. A resampled distortion-corrected, resized first image is constructed to provide a resampled, distortion-corrected, resized first image, thereby registering first image to the second image.

15 Claims, 16 Drawing Sheets

(56) References Cited

U.S. PATENT DOCUMENTS

| | | | |
|---|---|---|---|
| 9,369,612 | B2 | 6/2016 | Oh et al. |
| 9,811,892 | B1 | 11/2017 | Silverstein et al. |
| 9,866,805 | B2 | 1/2018 | Bechtel et al. |
| 10,326,979 | B2 | 6/2019 | Hall |
| 10,832,424 | B2 | 11/2020 | Fletcher et al. |
| 11,032,492 | B2 | 6/2021 | McManus et al. |
| 11,049,218 | B2 | 6/2021 | Khwaja et al. |
| 11,158,056 | B2 | 10/2021 | Lukac et al. |
| 2002/0176638 | A1* | 11/2002 | Stone ........................ G06T 5/70 |
| | | | 382/294 |
| 2009/0067755 | A1 | 3/2009 | Khamene et al. |
| 2017/0339395 | A1* | 11/2017 | Hall ..................... H04N 13/111 |
| 2018/0302564 | A1* | 10/2018 | Liu ........................ H04N 23/66 |
| 2020/0184683 | A1* | 6/2020 | Hu ............................ G06T 7/80 |
| 2020/0232800 | A1* | 7/2020 | Bai .................... G01C 21/3848 |
| 2020/0302582 | A1 | 9/2020 | Smirnov et al. |
| 2023/0138779 | A1* | 5/2023 | Liu ........................... G06T 5/50 |
| | | | 382/275 |
| 2024/0119566 | A1* | 4/2024 | Xiao ...................... G06V 10/60 |

FOREIGN PATENT DOCUMENTS

| | | | | |
|---|---|---|---|---|
| EP | 1657680 | A1 | 5/2006 | |
| EP | 1811771 | A1 * | 7/2007 | ............. H04N 23/67 |
| WO | 2020097130 | A1 | 5/2020 | |

OTHER PUBLICATIONS

Dame et al., "Second order optimization of mutual information for real-time image registration", IEEE Trans on Image Processing, 2012.

Kori et al., "Zero Shot Learning for Multi-Modal Real Time Image Registration", arXiv:1908.06213v1 [cs.CV] Aug. 17, 2019.

Nel, "Polar Rectification of Stereo Images Implemented on a GPU", International Conference on Information Technology and Computer Systems Engineering (ITCSE'2013) Nov. 27-28, 2013 Johannesburg (South Africa).

Pollefeys et al., "A simple and efficient rectification method for general motion", https://ieeexplore.ieee.org/xpl/conhome/6412/proceeding.

Vancea et al., "LUT-based Image Rectification Module Implemented in FPGA"https://ieeexplore.ieee.org/xpl/conhome/4352127/proceeding.

\* cited by examiner

*I11″ from distortion correction LUT 317*

315'

T1 RECTIFICATION LUT

442

WARPING LUT

444

INVERSE RECTIFICATION T2' LUT

446

*registered images I11′″*

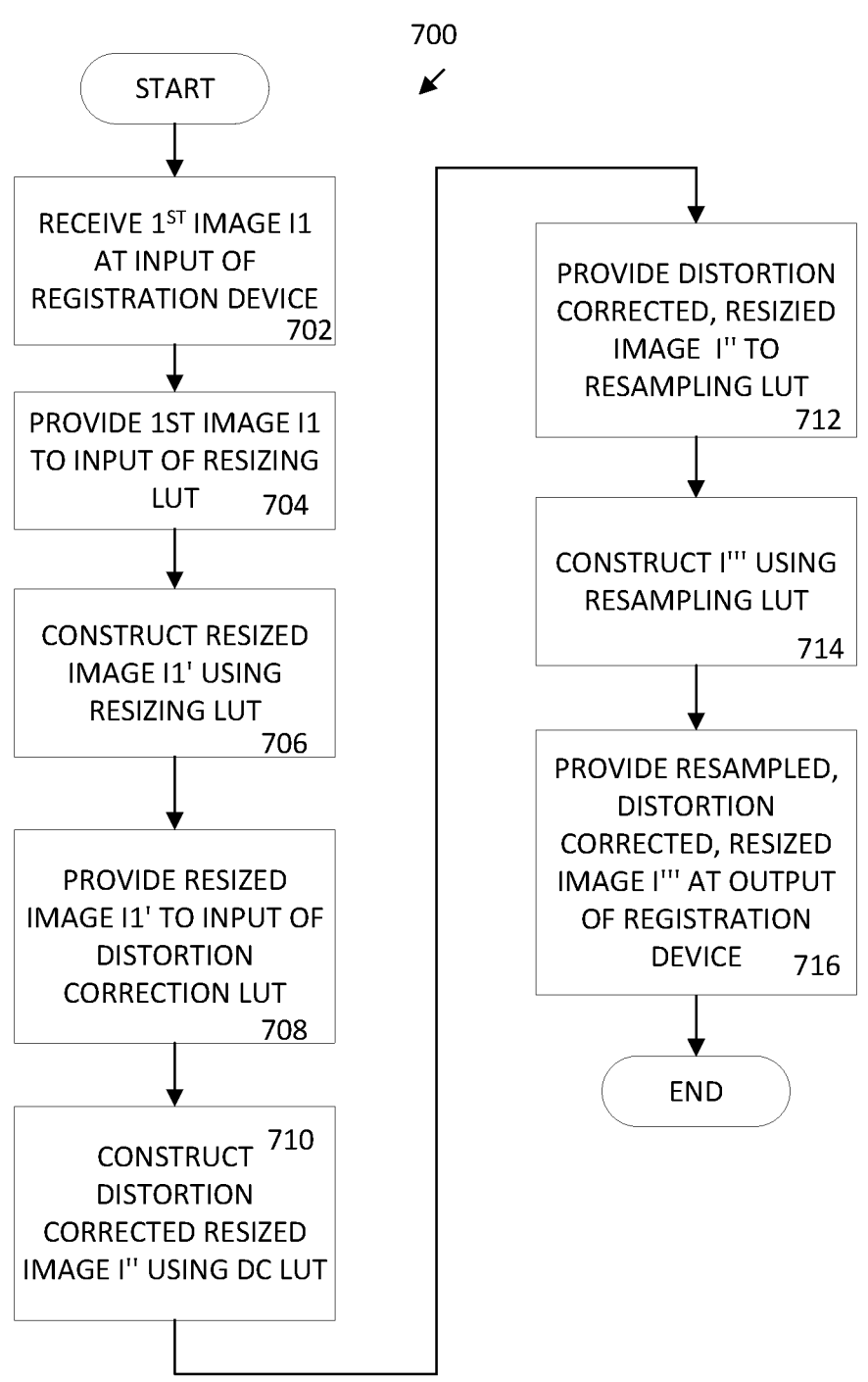

700

START

RECEIVE 1ST IMAGE I1 AT INPUT OF REGISTRATION DEVICE
702

PROVIDE 1ST IMAGE I1 TO INPUT OF RESIZING LUT          704

CONSTRUCT RESIZED IMAGE I1' USING RESIZING LUT
706

PROVIDE RESIZED IMAGE I1' TO INPUT OF DISTORTION CORRECTION LUT
708

710
CONSTRUCT DISTORTION CORRECTED RESIZED IMAGE I" USING DC LUT

PROVIDE DISTORTION CORRECTED, RESIZIED IMAGE I" TO RESAMPLING LUT
712

CONSTRUCT I"' USING RESAMPLING LUT
714

PROVIDE RESAMPLED, DISTORTION CORRECTED, RESIZED IMAGE I"' AT OUTPUT OF REGISTRATION DEVICE          716

END

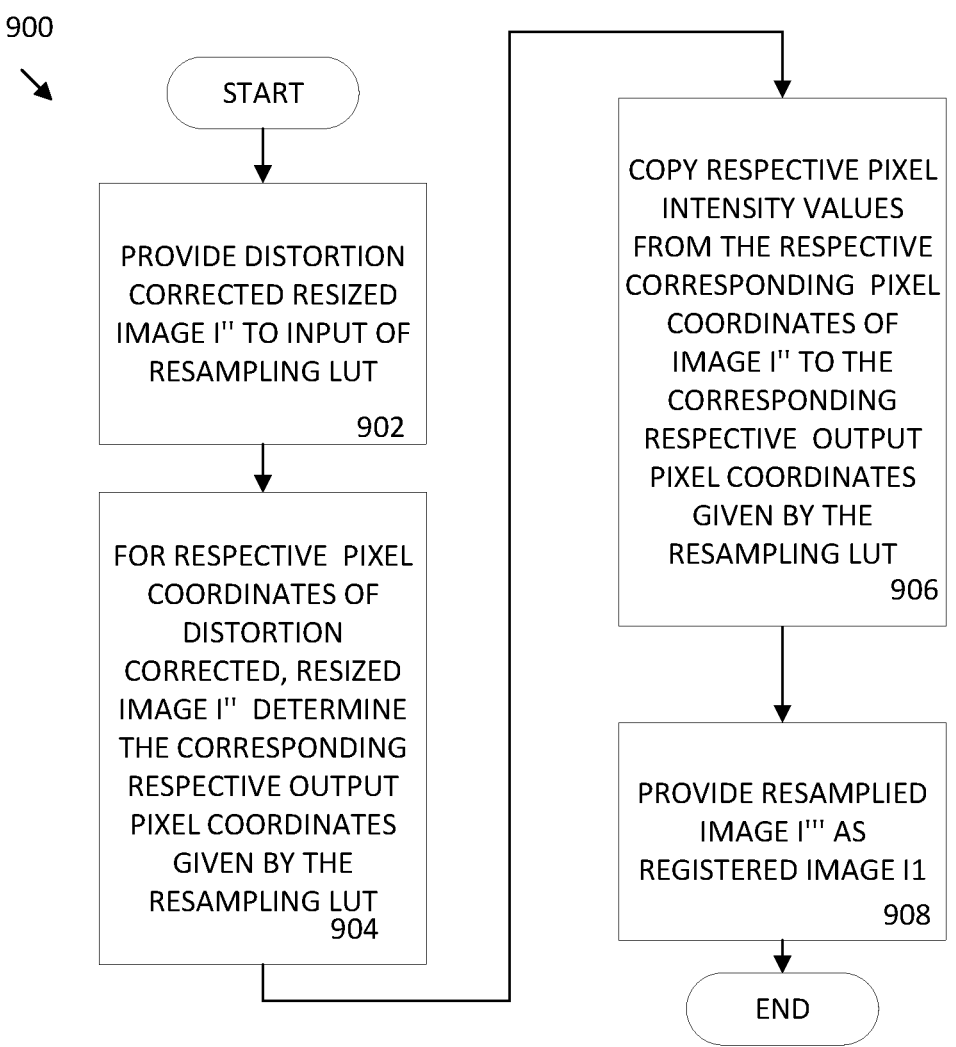

START

PROVIDE DISTORTION CORRECTED RESIZED IMAGE I" TO INPUT OF RESAMPLING LUT

902

FOR RESPECTIVE PIXEL COORDINATES OF DISTORTION CORRECTED, RESIZED IMAGE I" DETERMINE THE CORRESPONDING RESPECTIVE OUTPUT PIXEL COORDINATES GIVEN BY THE RESAMPLING LUT

904

COPY RESPECTIVE PIXEL INTENSITY VALUES FROM THE RESPECTIVE CORRESPONDING PIXEL COORDINATES OF IMAGE I" TO THE CORRESPONDING RESPECTIVE OUTPUT PIXEL COORDINATES GIVEN BY THE RESAMPLING LUT

906

PROVIDE RESAMPLIED IMAGE I'" AS REGISTERED IMAGE I1

908

END

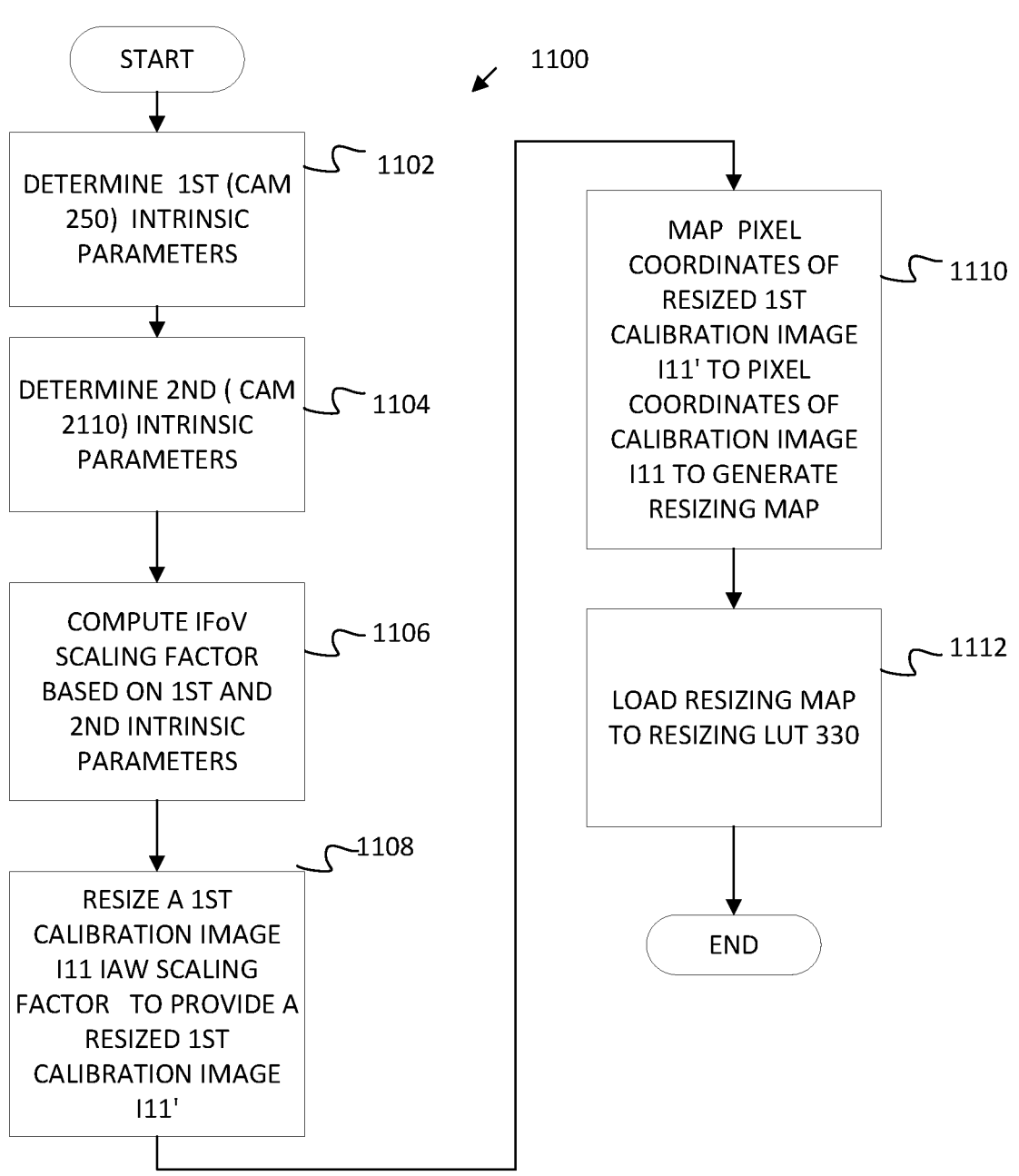

1100

START

DETERMINE 1ST (CAM 250) INTRINSIC PARAMETERS — 1102

DETERMINE 2ND ( CAM 2110) INTRINSIC PARAMETERS — 1104

COMPUTE IFoV SCALING FACTOR BASED ON 1ST AND 2ND INTRINSIC PARAMETERS — 1106

RESIZE A 1ST CALIBRATION IMAGE I11 IAW SCALING FACTOR TO PROVIDE A RESIZED 1ST CALIBRATION IMAGE I11' — 1108

MAP PIXEL COORDINATES OF RESIZED 1ST CALIBRATION IMAGE I11' TO PIXEL COORDINATES OF CALIBRATION IMAGE I11 TO GENERATE RESIZING MAP — 1110

LOAD RESIZING MAP TO RESIZING LUT 330 — 1112

END

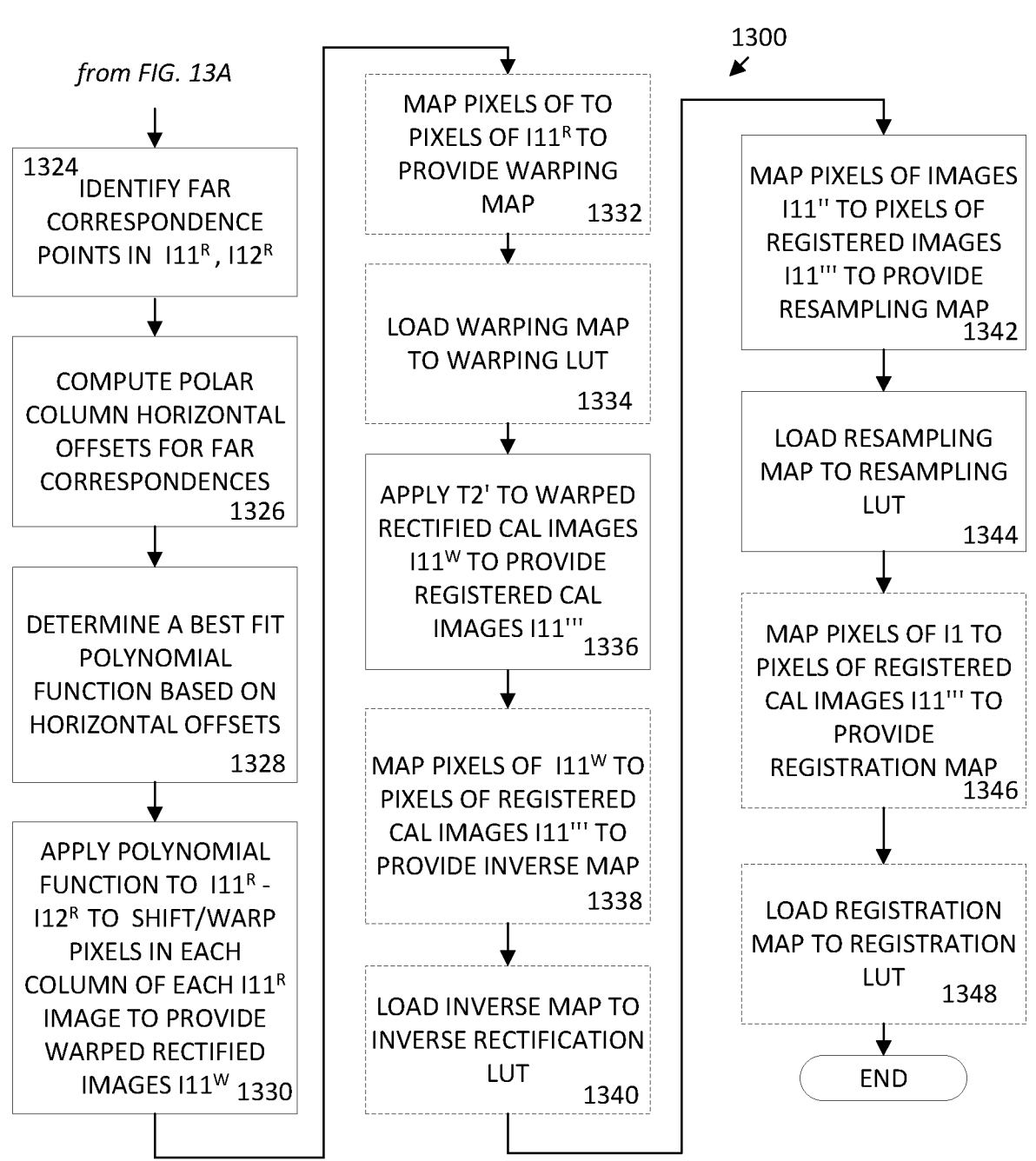

from FIG. 13A

1324 IDENTIFY FAR CORRESPONDENCE POINTS IN I11$^R$, I12$^R$

COMPUTE POLAR COLUMN HORIZONTAL OFFSETS FOR FAR CORRESPONDENCES
1326

DETERMINE A BEST FIT POLYNOMIAL FUNCTION BASED ON HORIZONTAL OFFSETS
1328

APPLY POLYNOMIAL FUNCTION TO I11$^R$ - I12$^R$ TO SHIFT/WARP PIXELS IN EACH COLUMN OF EACH I11$^R$ IMAGE TO PROVIDE WARPED RECTIFIED IMAGES I11$^W$ 1330

MAP PIXELS OF TO PIXELS OF I11$^R$ TO PROVIDE WARPING MAP     1332

LOAD WARPING MAP TO WARPING LUT
1334

APPLY T2' TO WARPED RECTIFIED CAL IMAGES I11$^W$ TO PROVIDE REGISTERED CAL IMAGES I11'''     1336

MAP PIXELS OF I11$^W$ TO PIXELS OF REGISTERED CAL IMAGES I11''' TO PROVIDE INVERSE MAP     1338

LOAD INVERSE MAP TO INVERSE RECTIFICATION LUT     1340

MAP PIXELS OF IMAGES I11'' TO PIXELS OF REGISTERED IMAGES I11''' TO PROVIDE RESAMPLING MAP     1342

LOAD RESAMPLING MAP TO RESAMPLING LUT     1344

MAP PIXELS OF I1 TO PIXELS OF REGISTERED CAL IMAGES I11''' TO PROVIDE REGISTRATION MAP     1346

LOAD REGISTRATION MAP TO REGISTRATION LUT     1348

END

FIG. 13B

REAL-TIME BLIND REGISTRATION OF DISPARATE VIDEO IMAGE STREAMS

BACKGROUND

A vehicle may be equipped with two or more video cameras that simultaneously capture images of the same scene in an environment surrounding a vehicle. It may be desirable to equip the vehicle with spectrally disparate cameras. Two cameras are spectrally disparate when one is configured to capture images in a first spectral band but not a second spectral band, and the other is configured to capture images in the second spectral band but not in the first spectral band. Images captured by spectrally disparate cameras are referred to herein as spectrally disparate images.

Two spectrally disparate images can be combined to form a single multispectral image. Multispectral images can aid humans in visualizing imaged objects by providing spectral information that would be missing in a single spectrum image. For example, some objects may be more visible in an infrared (IR) image due to their thermal properties, while others may have a more distinctive visual appearance in a red, green blue (RGB) image. A multispectral image can make both kinds of objects visible.

Two cameras are spatially disparate when they are separated longitudinally and/or laterally by a distance that introduces a parallax effect into the captured images. The further apart the cameras, the more pronounced the parallax effect. Vehicle structural arrangements, visibility, aesthetics, and other considerations can present challenges in camera placement. These considerations may dictate a spatial separation between cameras that produces parallax effects in their captured images.

To combine images of the same scene captured by two different cameras, the images are first registered. Registering images captured by either spatially or spectrally disparate cameras is computationally complex, and therefore resource intensive and time consuming. Registering images captured by cameras that are both spatially and spectrally disparate introduces further computational complexity, particularly for video images.

Real-time image registration refers to the capability to align images as they are captured or processed, without significant latency or time-consuming computations. The disclosure provides apparatus and methods for real-time registration of spatially and spectrally disparate video images.

DRAWINGS

FIG. 7 is a flowchart of a method for real-time registration of images;

FIG. 9 is a flowchart of an online resampling method for use in the method shown in FIG. 7;

FIG. 11 is a flowchart of a method for generating a resizing map;

Figure 13A:
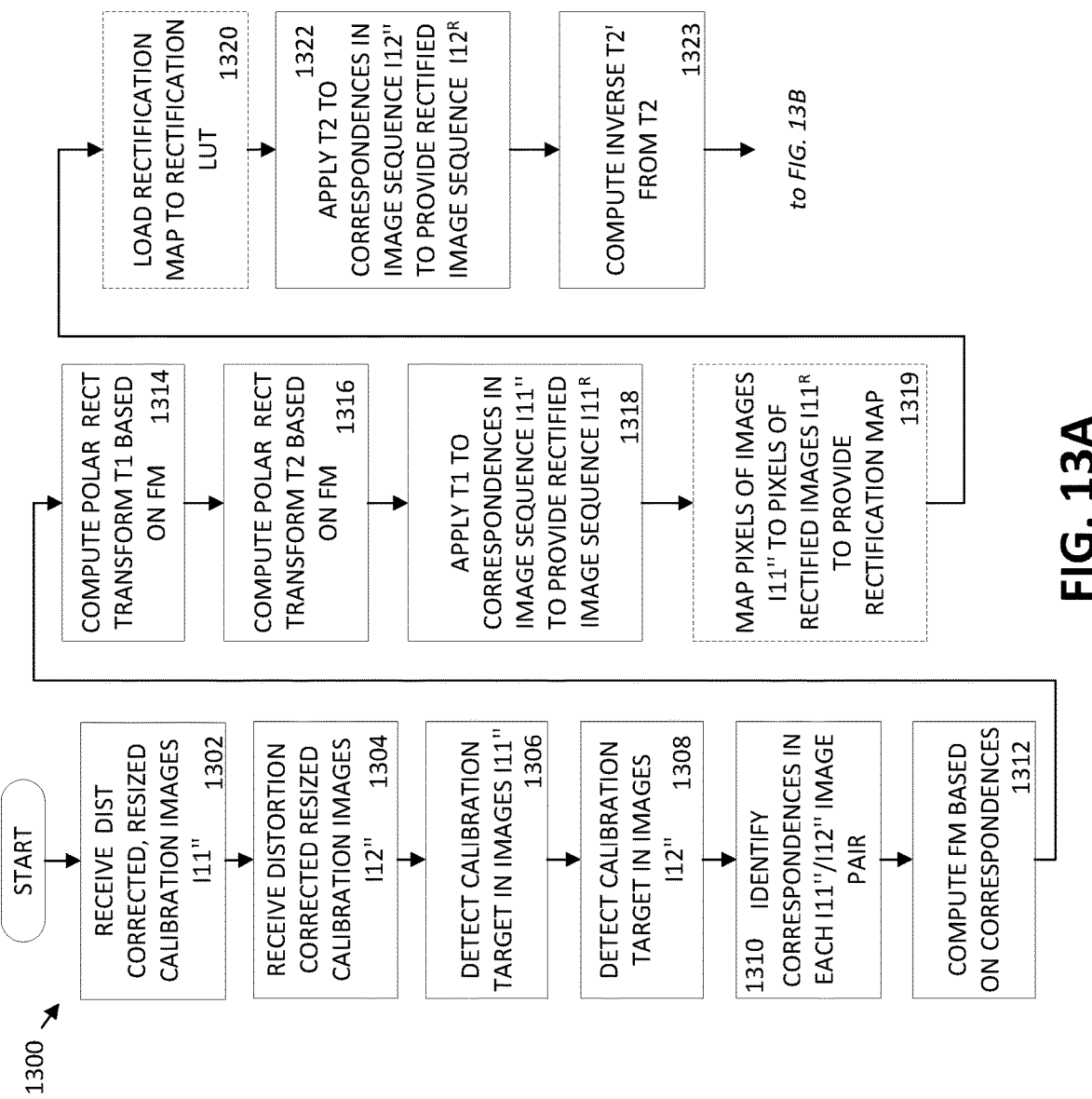
Figures 15, 16:
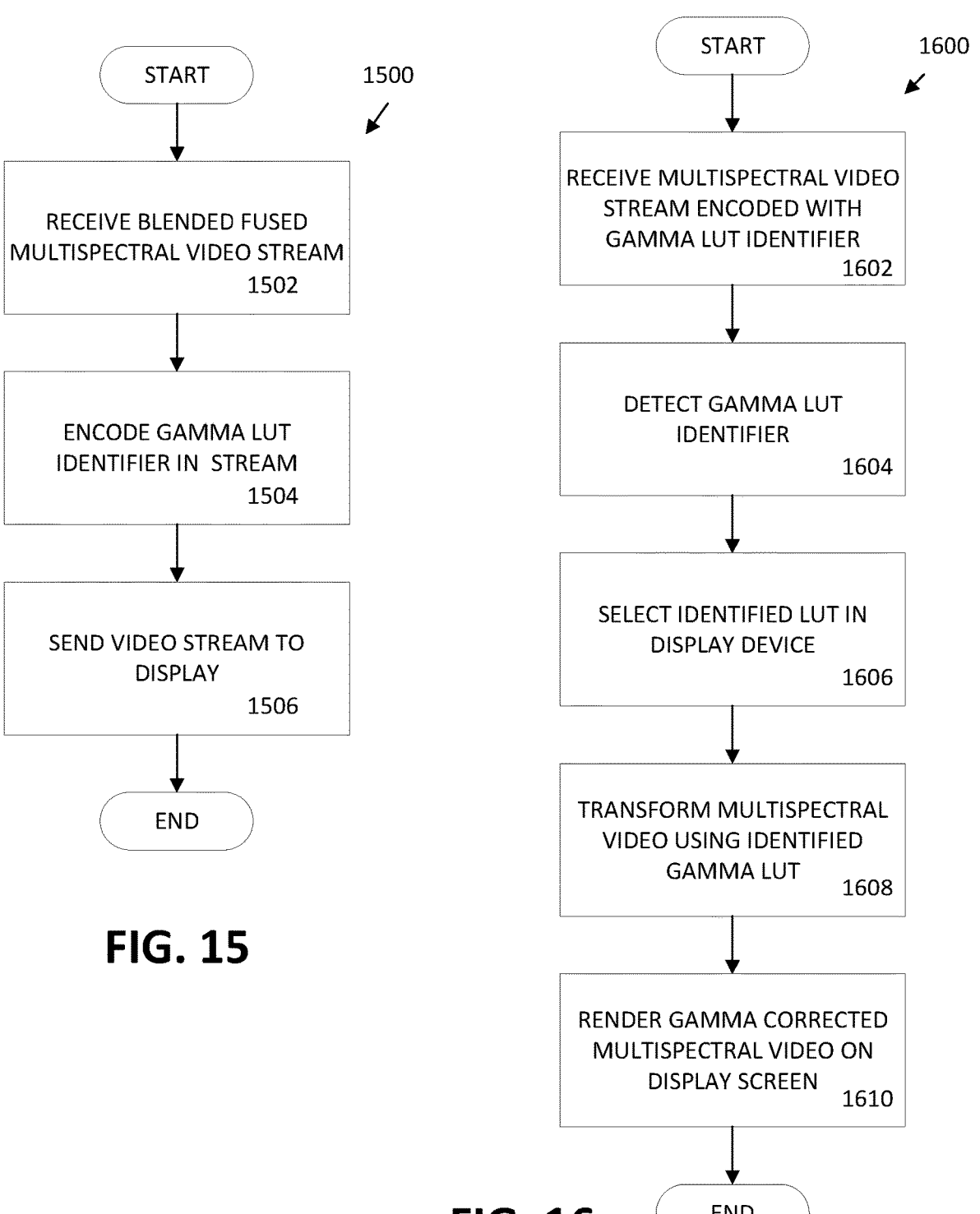

FIGS. 13A and 13B provide a flowchart of a method for generating a resampling map, a rectification map, an inverse rectification map, a warping map, and a registration map;

FIGS. 14A through 14D pictorially illustrate resizing a first calibration image;

FIG. 15 is a flowchart of a method for providing a stream of multispectral images; and FIG. 16 is a flowchart of a method for adjusting a gamma curve for displaying the multispectral images.

DESCRIPTION

Multi-spectral video images can be produced by combining video images captured by spectrally disparate video cameras. Images captured by spectrally disparate cameras are referred to herein as spectrally disparate images. To combine spectrally disparate images, including spectrally disparate video images, the images are first registered. Image registration is the process of aligning two or more images taken from different viewpoints or using different modalities. Two commonly used image registration techniques are feature-based registration and intensity-based registration. Feature-based registration involves identifying and matching distinctive features or keypoints in the images to establish feature or point correspondences. Distinctive features include corners, edges, blobs, or other salient points. Intensity-based registration relies on differences in pixel intensities in the images to estimate registration parameters. Due to the differences in spectral information, feature and intensity-based registration techniques may not be effective for spectrally disparate images, complicating the registration process.

Images captured by spatially disparate cameras can suffer from the parallax effect. The parallax effect is an apparent displacement of objects when viewed from different positions. Objects at different distances will have different relative positions in the two images. The further apart the imagers or cameras, the more pronounced the parallax effect. This makes it difficult to establish correspondences to register the images effectively. Furthermore, rectification techniques for registering images captured by widely separated cameras involve complex geometric transformations and warping to overcome parallax effects. These transformations require significant computational resources.

Blind image registration refers to a process of registering two or more images in the absence of any knowledge or information about their features, their pixel intensities or about objects in the images. Real-time image registration refers to the capability of registering images as they are acquired or processed, without significant latency or time-consuming computations.

Disclosed herein are apparatus and methods for real-time, blind registration of spatially and spectrally disparate video images.

An apparatus can comprise a processor; a memory coupled to the processor, the memory including processor executable instructions, which when executed by the processor configure the processor to receive a first image of a scene captured by a first camera; and register the first image to a second image of the scene captured by a second camera without information about features of the first image and without processing the second image.

The processor may be further configured to for respective pixel coordinates of a resized calibration image, determine corresponding pixel coordinates of a first calibration image; for respective corresponding pixel coordinates of the first calibration image, determine respective corresponding pixel coordinates of the first image; and for the corresponding respective pixel coordinates of the first image, copy pixel intensity values of the first image to the corresponding pixel coordinates of the resized calibration image, thereby constructing a resized first image having an instantaneous field of view (IFoV) corresponding to an IFoV of the second image.

The processor may be further configured to, for respective pixel coordinates of a distortion-corrected, resized first calibration image, determine corresponding respective pixel coordinates of the resized first calibration image; for the corresponding respective pixel coordinates of the resized first calibration image, determine corresponding respective pixel coordinates of the resized first image; and copy respective pixel intensity values from the corresponding respective pixel coordinates of the resized first image to the pixel coordinates of the distortion-corrected, resized first calibration image, thereby constructing a distortion-corrected, resized first image.

The processor may be further configured to, for corresponding respective pixel coordinates of a distortion-corrected, resized first calibration image, determine corresponding respective pixel coordinates of the distortion-corrected, resized first image; and, from the corresponding respective pixel coordinates of the distortion-corrected, resized first image, copy pixel intensity values to the respective pixel coordinates of the resampled, distortion-corrected, resized first calibration image, thereby constructing a resampled, distortion-corrected, resized first image registered to the second image.

The processor may be further configured to construct a resized first image having an instantaneous field of view (IFoV) corresponding to an IFoV of the second image; construct a distortion-corrected, resized first image; and construct a resampled, distortion-corrected, resized first image to provide a resampled, distortion-corrected, resized first image comprising the first image registered to the second image. The processor may be further configured to rectify the distortion-corrected, resized first image to provide a rectified, distortion-corrected, resized first image; warp the rectified, distortion-corrected, resized first image to provide a warped, rectified, distortion-corrected, resized first image; and inverse rectify the warped, rectified, distortion-corrected, resized first image thereby constructing the resampled, distortion-corrected, resized first image. The processor may be further configured to copy respective pixel intensity values from corresponding respective Cartesian coordinates of the distortion-corrected, resized first image, to corresponding respective polar pixel coordinates of a rectified, distortion-corrected, resized first calibration image, thereby constructing the rectified, distortion-corrected, resized first image. The processor may be further configured to copy pixel intensity values from respective pixel coordinates of the rectified, distortion-corrected, resized first image to corresponding respective pixel coordinates of a warped, rectified, distortion-corrected resized first calibration image, thereby constructing the warped, rectified, distortion-corrected, resized first image. The processor may be further configured to copy pixel intensity values from the warped, rectified, distortion-corrected, resized first image to corresponding respective pixel coordinates of a warped, distortion-corrected, resized first image to corresponding respective pixel coordinates of the first calibration image registered to a second calibration image, thereby constructing the resampled, distortion-corrected, resized first image comprising the first image registered to the second image.

The processor may be further configured to determine respective pixel coordinates of the first image corresponding to respective pixel coordinates of a first calibration image; and copy pixel intensity values from the respective pixel coordinates of the first image, to the corresponding respective pixel coordinates of a registered first calibration image thereby registering the first image registered to the second image.

A method comprises receiving a first image of a scene captured by a first camera; and registering the first image to a second image of the scene captured by a second camera without information about features of the first image and without processing the second image.

The method may further comprise, for respective pixel coordinates of a resized calibration image, determining corresponding pixel coordinates of a first calibration image; for respective corresponding pixel coordinates of the first calibration image, determining respective corresponding pixel coordinates of the first image; and, for the corresponding respective pixel coordinates of the first image, copying pixel intensity values of the first image to the corresponding pixel coordinates of the resized calibration image, thereby constructing a resized first image having an instantaneous field of view (IFoV) corresponding to an IFoV of the second image. The method may further comprise, for respective pixel coordinates of the distortion-corrected, resized first calibration image, determining corresponding respective pixel coordinates of the resized first calibration image; for the corresponding respective pixel coordinates of the resized first calibration image, determining corresponding respective pixel coordinates of the resized first image; and copying respective pixel intensity values from the corresponding respective pixel coordinates of the resized first image to the pixel coordinates of the distortion-corrected, resized first calibration image, thereby constructing a distortion-corrected, resized first image. The method may further comprise, for the corresponding respective pixel coordinates of the distortion-corrected, resized first calibration image, determining corresponding respective pixel coordinates of the distortion-corrected, resized first image; and, from the corresponding respective pixel coordinates of the distortion-corrected, resized first image, copying pixel intensity values to the respective pixel coordinates of the resampled, distortion-corrected, resized first calibration image, thereby constructing a resampled, distortion-corrected, resized first image registered to the second image.

The method may further comprise constructing a resized first image having an instantaneous field of view (IFoV) corresponding to an IFoV of the second image; constructing a distortion-corrected, resized first image; and constructing a resampled, distortion-corrected, resized first image to provide a resampled, distortion-corrected, resized first image comprising the first image registered to the second image. The method may further comprise rectifying the distortion-corrected, resized first image to provide a rectified, distortion-corrected, resized first image; warping the rectified, distortion-corrected, resized first image to provide a warped, rectified, distortion-corrected, resized first image; and inverse rectifying the warped, rectified, distortion-corrected, resized first image, thereby constructing the resampled, distortion-corrected, resized first image. The method may further comprise constructing the rectified, distortion-corrected, resized first image by copying respective pixel intensity values from corresponding respective Cartesian coordinates of the distortion-corrected, resized first image, to corresponding respective polar pixel coordinates of a rectified, distortion-corrected, resized first calibration image. The method may further comprise constructing the warped, rectified, distortion-corrected, resized first image by copying pixel intensity values from respective pixel coordinates of the rectified, distortion-corrected, resized first image to corresponding respective pixel coordinates of a warped, rectified, distortion-corrected resized first calibration image. The method may further comprise constructing the resampled, distortion-corrected, resized first image by copying pixel intensity values of the warped, rectified, distortion-corrected, resized first image, to corresponding respective pixel coordinates of a resampled, distortion-corrected, resized first calibration image.

The method may further comprise determining respective pixel coordinates of the first image corresponding to the respective pixel coordinates of a first calibration image; and copying pixel intensity values from the respective pixel coordinates of the first image to the corresponding respective pixel coordinates of a registered first calibration image, thereby registering the first image registered to the second image.

Figure 1:
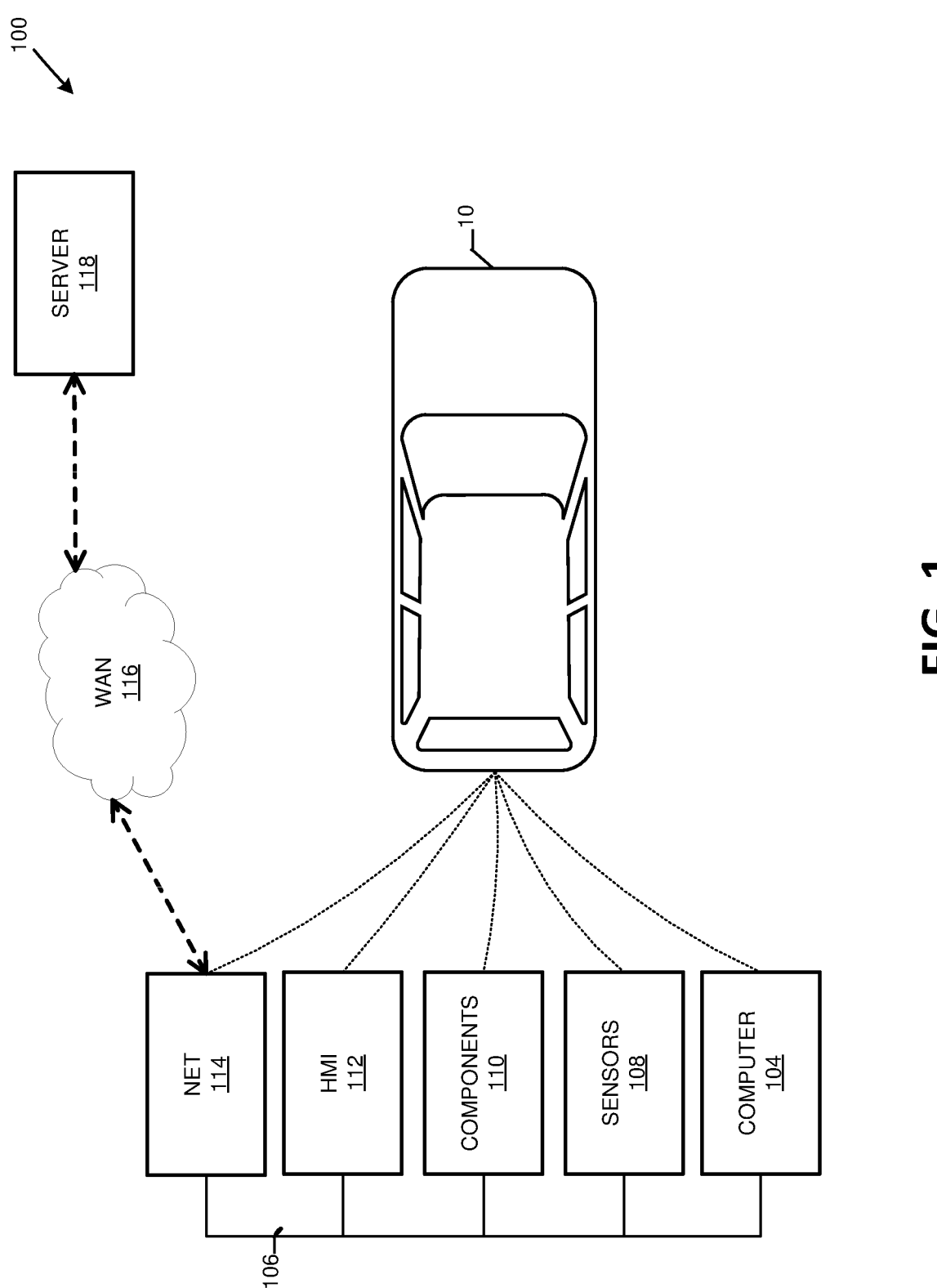
FIG. 1 is a block diagram of an example vehicle system suitable for implementing the disclosed apparatus and methods.

FIG. 1 is a block diagram of an example vehicle 10 including a vehicle system 100 suitable for implementing the disclosed apparatus and methods. Vehicle system 100 can include vehicle 10 equipped with sensors 108 including one or more imaging sensors (examples illustrated in FIG. 2). Sensors 108 can also include one or more ranging sensors (not separately depicted).

Vehicle 10 includes a vehicle computer 104, which may include one or more electronic control units (ECU) disposed within vehicle 10 to control operation of various devices and components of vehicle 10. Computer 104 can be programmed to send and/or receive, messages via vehicle network 114 to communicate with other devices disposed within in vehicle e.g., sensors 108, actuators, components 110, communications modules, a human machine interface (HMI) 112, etc.

Vehicle system 100 can include one or more vehicle networks 114 over which the various electronic control units (ECU), including computer 104 can intercommunicate to send commands and/or exchange, send or receive data. a vehicle network 114 could include but is not limited to one or more of a controller area network (CAN), local interconnect network (LIN), Ethernet, Wi-Fi®, and/other wired or wireless communication networks. In some implementations vehicle computer 104 and/or other components of vehicle system 100 may be configured to communicate with a remote server 118 via a wide area network (WAN) 116.

A computer 104 includes a processor and a memory such as are known. Further, the memory includes one or more forms of computer-readable media, and stores instructions executable by the processor for performing various operations, including as disclosed herein. For example, the computing device 104 may include programming to operate one or more of vehicle brakes, propulsion (i.e., control of acceleration in the vehicle 10 by controlling one or more of an internal combustion engine, electric motor, hybrid engine, etc.), steering, climate control, interior and/or exterior lights, etc., as well as to determine whether and when the computing device 104, as opposed to a human operator, is to control such operations.

The computing device 104 may include or be communicatively coupled to, i.e., via a vehicle communications bus as described further below, more than one computing devices, i.e., controllers or the like included in the vehicle 10 for monitoring and/or controlling various vehicle components, i.e., propulsion, braking, steering, etc. The computing device 104 is arranged for communications on a vehicle communication network 114, i.e., including a bus in the vehicle 10 such as a controller area network (CAN) or the like; the vehicle 10 network 114 can additionally or alternatively include wired or wireless communication mechanisms such as are known, i.e., Ethernet or other communication protocols.

Via the vehicle network 114, the computing device 104 may transmit messages to various devices in the vehicle and/or receive messages from the various devices, i.e., controllers, actuators, sensors, etc., including sensors 108. Alternatively, or additionally, in cases where the computing device 104 comprises multiple devices, the vehicle communication network 114 may be used for communications between devices represented as the computing device 104 in this disclosure. Further, as mentioned below, various controllers or sensing elements such as sensors 108 may provide data to the computing device 104 via the vehicle communication network 114.

In addition, the computing device 104 may be configured for communicating through a vehicle-to-infrastructure (V2X) interface with a remote server computer 118, i.e., a cloud server, via a network 116, which, as described below, includes hardware, firmware, and software that permits computing device 104 to communicate with a remote server computer 118 via a network 116 such as wireless Internet (WI-FI®) or cellular networks. A V2X interface may accordingly include processors, memory, transceivers, etc., configured to utilize various wired and/or wireless networking technologies, i.e., cellular, BLUETOOTH®, Bluetooth Low Energy (BLE), Ultra-Wideband (UWB), Peer-to-Peer communication, UWB based Radar, IEEE 802.11, and/or other wired and/or wireless packet networks or technologies. Computing device 104 may be configured for communicating with other vehicles 10 through V2X (vehicle-to-everything) interface using vehicle-to-vehicle (V-to-V) networks, i.e., according to including cellular communications (C-V2X) wireless communications cellular, Dedicated Short Range Communications (DSRC) and/or the like, i.e., formed on an ad hoc basis among nearby vehicles or formed through infrastructure-based networks. The computing device 104 also includes nonvolatile memory such as is known. Computing device 104 can log data by storing the data in nonvolatile memory for later retrieval and transmittal via the vehicle communication network 114 and a vehicle to infrastructure (V2X) interface to a server computer 118 or a user mobile device.

As already mentioned, included in instructions stored in the memory and executable by the processor of the computing device 104 is programming for operating one or more vehicle 10 components, i.e., braking, steering, propulsion, etc., without intervention of a human operator. Using data received in the computing device 104, i.e., the sensor data from the sensors 108, the server computer 118, etc., the computing device 104 may make various determinations and/or control various vehicle 10 components and/or operations. For example, the computing device 104 may include programming to regulate vehicle 10 operational behaviors (i.e., physical manifestations of vehicle 10 operation) such as speed, acceleration, deceleration, steering, etc., as well as tactical behaviors (i.e., control of operational behaviors typically in a manner intended to achieve efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Sensors 108 may include a variety of imaging devices such as cameras and/or other devices known to provide data via the vehicle communications bus. For example, a radar fixed to a front bumper (not shown) of the vehicle 10 may provide a distance from the vehicle 10 to a next vehicle in front of the vehicle 10, or a global positioning system (GPS) sensor disposed in the vehicle 10 may provide geographical coordinates of the vehicle 10. The distance(s) provided by the radar and/or other sensors 108 and/or the geographical coordinates provided by the GPS sensor may be used by the computing device 104 to operate the vehicle 10 autonomously or semi-autonomously, for example, e.g., to control one or more of propulsion, steering, and/or braking.

Vehicle and Cameras

Figure 2:
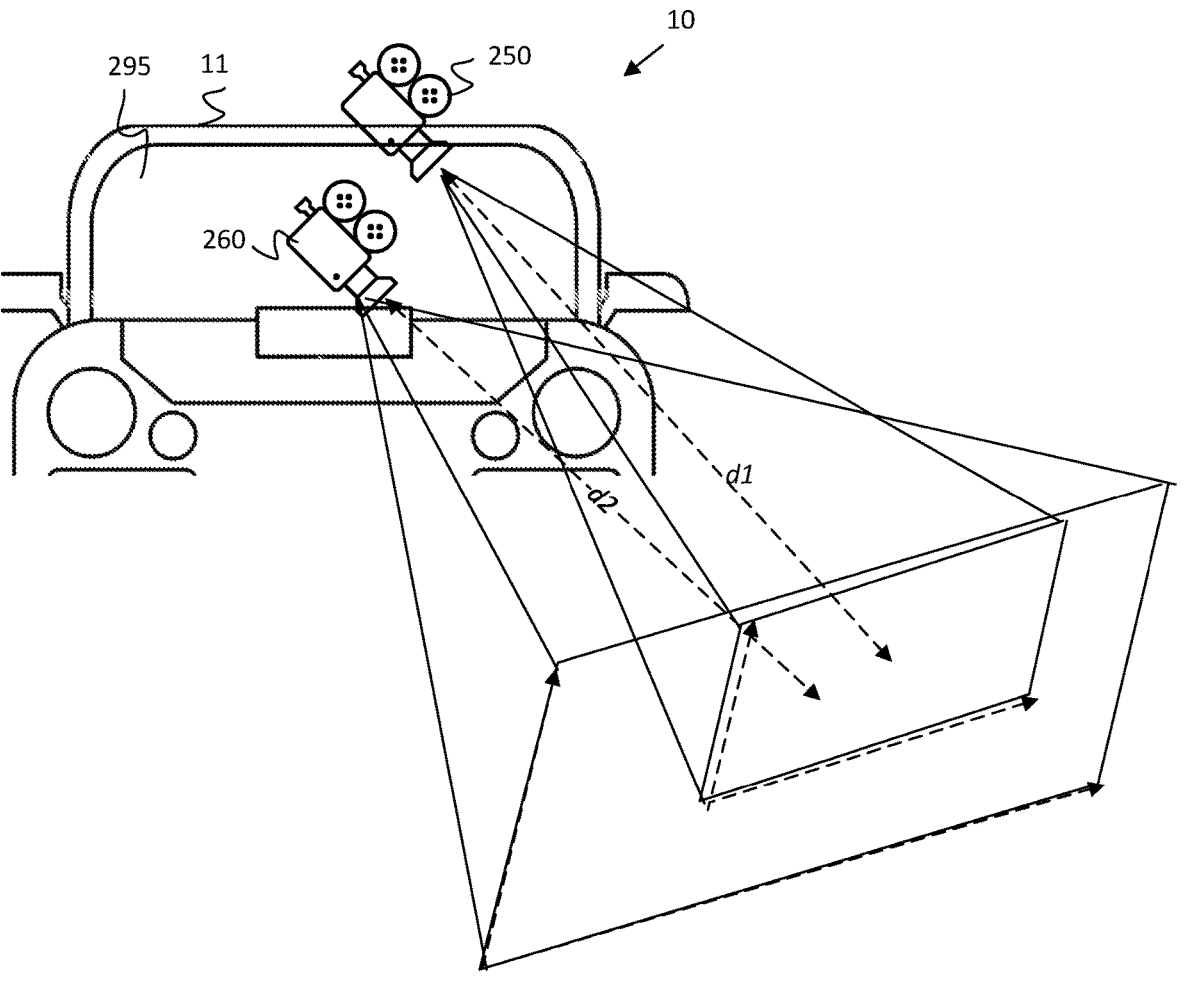
FIG. 2 is a diagram of an example vehicle equipped with imaging sensors suitable for implementing the disclosed apparatus and methods.

FIG. 2 is a front elevation view of vehicle 10 equipped with a first camera 250 and a second camera 260 mounted in fixed relationship on suitable exterior and/or interior structures of vehicle 10. Camera 250 can be a video camera of any suitable sensor array size, e.g. 320×240 sensels. In an example implementation. images captured by camera 250 are eight-bit gray scale images. In the example implementations disclosed herein, camera 250 comprises a Long-Wave Infrared (LWIR) band imager sensitive to energy in the thermal infrared wavelength band. The LWIR band spans wavelengths roughly between 8 to 15 micrometers (μm). Accordingly, LWIR camera 250 can detect and capture thermal radiation emitted by objects and surfaces.

Thermal images allow visualization of heat signatures, temperature variations, and thermal patterns that are not visible to the unaided human eye and are not captured by other imaging sensors. Thermal images are useful for low light or no light applications, night vision, surveillance, thermal analysis, and remote sensing as well as for applications that require imaging in challenging atmospheric environments such as smoke, fog, and haze.

In other example implementations camera 250 can comprise a near infrared (NIR) imaging sensor. The NIR band is a portion of the electromagnetic spectrum that extends from approximately 700 nanometers (nm) to 2500 nm, although the exact boundaries can vary depending on the context and application. The NIR band is adjacent to the visible spectrum, which encompasses wavelengths that are visible to the human eye.

In other implementations, camera 250 can comprise a shortwave infrared (SWIR) imaging sensor. SWIR a portion of the electromagnetic spectrum that spans wavelengths approximately between about 700 to about 3000 nanometers (nm). SWIR radiation has better atmospheric transmission compared to longer-wavelength infrared bands. It can penetrate fog. smoke, and haze, better than LWIR (Long-Wave Infrared) radiation. SWIR imaging is suitable for applications where visibility is limited due to atmospheric interference. SWIR radiation can penetrate water to some extent. This property enables a SWIR camera to detect underwater objects.

A second camera 260 can be a Red, Green, and Blue (RGB) camera. An RGB camera typically has a sensor with three separate sensels per pixel, each sensel sensitive to one of these primary colors. Second camera 260 can be an RGB video camera including a sensor comprising an array of sensing elements (sensels), e.g., an array of Complementary Metal Oxide Semiconductors (CMOS), charge coupled devices (CCD) or other suitable light sensing elements. In some implementations. camera 260 can be a Complementary Metal Oxide Semiconductor (CMOS) sensor providing a red, green, blue, white (RGBC) light imager that adds a clear (unfiltered) pixel to an RGB filter array. In one example implementation camera 260 can be a 2 Mega Pixel (MP) imager having a resolution of 1980×1080, with a three-micron physical pixel size, a focal length between 3.14 and 2.42 millimeters (mm) and a horizontal field of view (HFOV) of 85-100 or more degrees.

The above examples are illustrative only. The disclosure is not limited by wavelength band of first and second cameras 250, 260. Likewise, the disclosure is not limited to registration of spectrally or spatially disparate images. While the examples provided herein are described in the context of images acquired by cameras carried by vehicles, the disclosed apparatus and methods are not limited to registration of images captured by cameras carried by vehicles. It will be appreciated, the image registration apparatus and methods described herein will find a variety of practical applications including marine applications, search and rescue applications and augmented reality video games.

In the disclosed examples, cameras 250 and 260 are digital video cameras, each including an imaging sensor comprising 2D array of light sensing elements (sensels) that form a 2D likeness (image) of a scene. A digital camera can be modeled by a 3×4 camera projection matrix that encodes the intrinsic parameters of the camera and a 4×4 matrix projection. Extrinsic parameters specify the external geometric attributes of the camera by which point coordinates in the 3D world coordinate system are mapped to point coordinates in the 3D camera view coordinate system. A camera view coordinate system has its origin on the image plane (the plane of its sensor array) and the Z-axis is perpendicular to the image plane.

Intrinsic parameters are transforms, or matrices that convert point coordinates from the camera 3D coordinate system to point coordinates in the camera's 2D pixel coordinate system. An array of pixel intensity values defines an image. Each pixel intensity value has a position in the array. The position is specified by pixel coordinates. Pixel coordinates of an image can be determined by dividing the image coordinates by pixel width and height, which are parameters of the camera specified in units of meter per pixel.

In the example implementation of FIG. 2, camera 250 is positioned on a top surface 11 of vehicle 10 while camera 260 may be disposed within vehicle 10, e.g., positioned behind or near a rearview mirror. The relative positions of camera 250 and 260 in any given implementation can vary. When physical constraints are considered in an installation, camera 250 and camera 260 may be separated by a distance that can create undesirable geometric parallax effects. Parallax is a displacement or difference in the apparent position of an object viewed along two different lines of sight. The greater the distance separating the cameras from one another, the greater the geometric parallax.

The degree to which parallax affects the apparent position of an object in a captured image is also determined by the distance separating the object from the cameras at the time of capture. In general, objects closer to the cameras at the time of image capture will exhibit larger differences in apparent position in the captured images. This effect can be seen in FIG. 2 as lines of sight d1 and d2 are not parallel but converging with distance from cameras 250, 260. The strong relationship between parallax and object distance relative to the cameras poses a challenge when aligning two dimensional (2D) images because 2D images provide little depth information to determine the distance of an object from the cameras.

Two 2D images can be approximately aligned by a simplified technique that trades absolute registration fidelity for computational simplicity. In applications that do not require individual pixel-level registration, a single interpolation implemented as a look up table (LUT) can be advantageously used. A LUT herein means a data structure, for example an array, that receives as input a first value and uses the first value as an index to select a second value as output from the LUT. The single interpolation can combine three discrete steps into a single LUT operation: 1. Resize the lower resolution image to match the higher-resolution image. 2. Perform distortion correction of the lower resolution image. 3. Re-sampling to shift the lower resolution image into alignment with the higher resolution image.

Resizing can be performed based on basic camera parameters such as focal distance, location of an optical center with respect to the image sensor, and image sensor size. Distortion correction can be based on camera manufacturer's specifications or determined based on imaging a fiducial pattern such as a checkerboard. Acquiring images of a fiducial pattern using both cameras installed in vehicle 10 can be used to determine camera alignment. Performing camera approximate alignment using a LUT can reduce computing resources required to align images as compared to exact techniques that require one or more matrix operations.

Image Registration Apparatus

Figure 3:
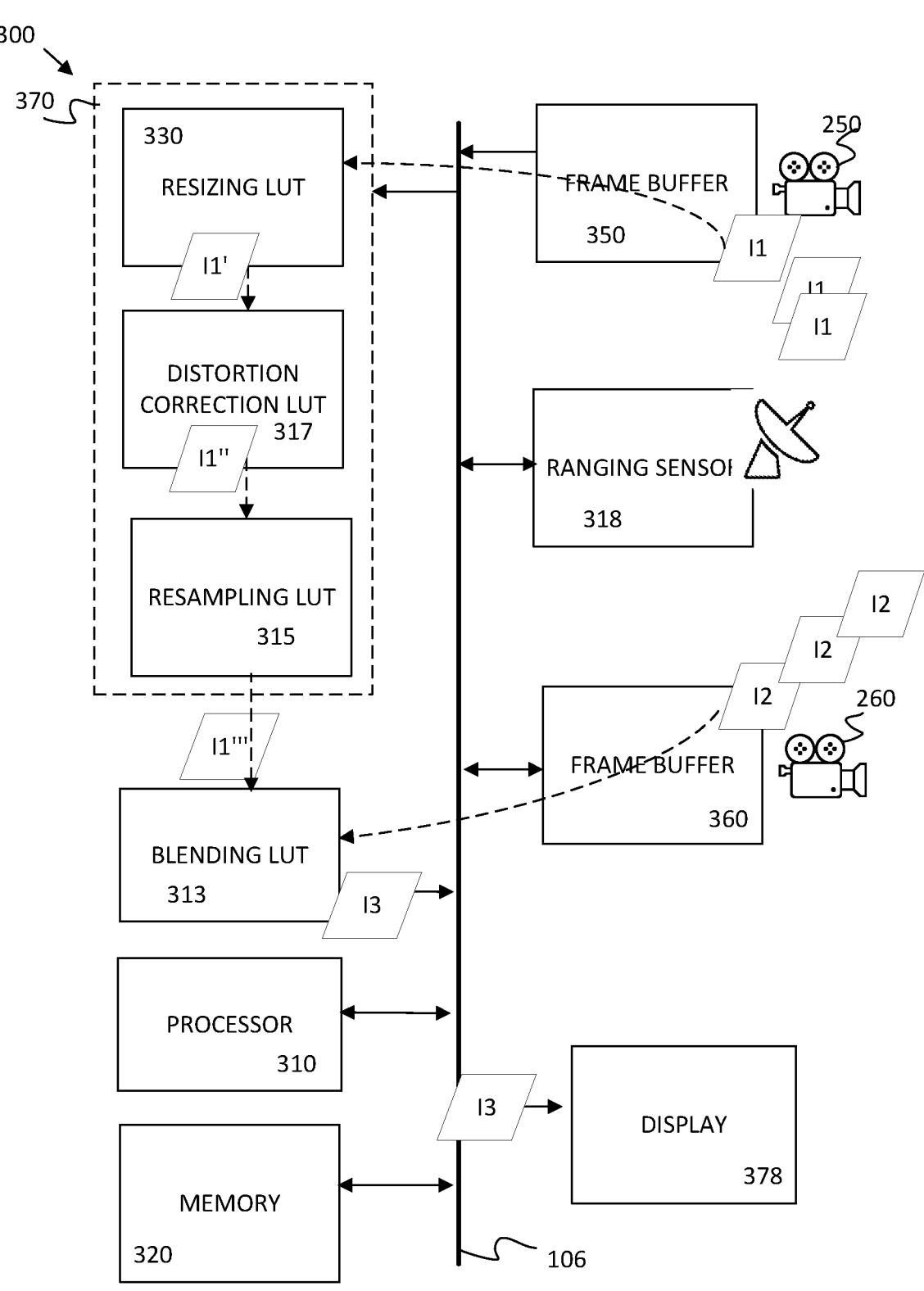
FIG. 3 is a block diagram of an apparatus for registering disparate images.

FIG. 3 is a block diagram of an image registration apparatus 300 for real time, blind registration of spatially and spectrally disparate video images captured by spectrally and spatially video cameras 250, 260 described above. Apparatus 300 comprises a processor 310, a memory 320 and an image registration device 370.

Image registration device 370 comprises LUTs 330, 317 and 315. LUTs 330, 317 and 315 are configured by an offline calibration process in which processor 310 executes processor executable instructions to encode respective image registration functions as functional relationships established by respective output (and vice versa) to input pixel coordinate maps. LUTs 330, 317 and 315 are configured by loading them with their respective output to input pixel coordinate maps.

In this disclosure an 'offline process' refers to a process that is performed only when the vehicle is not in routine operational use, e.g., during vehicle production or maintenance, or during installation of cameras 250, 260 or during installation of image registration apparatus 300 or like situations. In the offline image registration process, cameras 250, 260 capture and register calibration images only. Calibration images are images of special objects, e.g., a calibration target bearing a special pattern such as a checkerboard pattern.

Once the offline calibration process is completed, the functional relationships encoded in the pixel coordinate maps are static, i.e., fixed. They do not change in the online registration process. Image registration device 370 can then be used 'online' to register non-calibration images captured by cameras 250, 260 (or their equivalents). Non-calibration images are images of scenes in the environment surrounding vehicle 10 and captured by cameras 250, 260 during routine use (online use) of vehicle 10.

Cameras 250 and 260 may be used in the offline calibration process as well as in the online image registration process as long as the fixed spatial relationship between camera 250 and camera 260 is maintained. If one or both of cameras 250, 260 are replaced, the offline calibration process can be repeated. Cameras 250, 260 used offline for calibration can be different cameras than those used for online image registration as long as the cameras used online have the same imaging modalities as the cameras used offline, have the same fixed spatial relationship as the cameras used offline, and have the same intrinsic and extrinsic camera parameters as the cameras used offline.

As noted above, LUT 330, LUT 317 and LUT 315 are static devices. Their respective pixel mappings do not change during online use. In the online registration process, they provide the functional relationships encoded in their mappings for every non-calibration image they receive at their respective inputs, regardless of non-calibration image content. Accordingly, processor 310 performs indexing operations in accordance with the maps to register the non-calibration images in accordance with the encoded functions.

In that sense, the online image registration process is a 'blind' image registration process. The online process is performed in its entirety in the total absence of feedback or knowledge of features or other content of the images I1 received at its input, and in the absence of knowledge of the features or content of images I2 captured by camera 260 to which images I1 will be registered.

Image registration device 370 comprises a distortion-correction transform look up table (LUT) 317, a resizing LUT 330, and a resampling LUT 315. LUTs 330, 317, 315 are static devices. They perform their respective functions in the same manner for every image they receive regardless of image content. They are also blind because they perform their respective functions in the absence of feedback or knowledge of features or other content of the images they receive. LUTs 330, 317, 315 can be implemented in software as data structures included in memory, or in hardware, e.g., as solid-state memory devices comprising arrays of memory cells having address lines configured to serve as inputs and data lines configured to serve as outputs. Suitable structures include Field Programmable Gate Arrays (FPGAs), Graphics Processing Units (GPU), Application Specific Integrated Circuits ("ASIC"), Read Only Memory (ROM). Electrically Programmable ROM (EPROM), Random Access Memory (RAM), Electrically Erasable PROM (EEPROM), and like devices.

The respective mappings encode corresponding respective functions by functionally relating inputs to outputs, e.g., input image pixels to output image pixels. The mappings are generated in an offline calibration procedure (see method illustrated in FIG. 8).

Resizing LUT 330 is configured with a resizing map loaded into LUT 330 during an offline calibration process. The resizing map encodes a resizing function performed by processor 310 during the offline calibration process to generate a resized calibration image. The resizing map encodes the resizing function as a functional relationship established between respective source image pixel coordinates and corresponding respective output pixel coordinates.

When processor 310 configures resizing LUT 330 with the resizing map, the functional relationship is preserved.

Once LUT 330 is configured with the resizing map, the mapping does not change regardless of any change in the input image.

In the online image registration process, resizing LUT 330 maps respective output pixel coordinates defining a resized source image, to corresponding respective input pixel coordinates of the source image using the map generated in the offline process, thereby preserving the functional relationship encoded in the map. The resizing map does not change with changes in source images in the online process. However, the pixel intensity values of the resized source image do change when the source image changes in the online process. The pixel intensity values of the resized source image constructed in the online process correspond to the pixel intensity values of image I1 captured in the online process, and not to the pixel intensity values of the calibration image I11 used to encode the functional relationship in the resizing map.

Accordingly, in the online image registration process, processor 310 determines input pixel coordinates corresponding to the output pixel coordinates provided by the resizing map of LUT 330. Processor 310 copies pixel intensity values from the input pixel coordinates of image I1 in accordance with the input pixel coordinates determined by processor 310 with reference to the resizing map, to the respective corresponding output pixel coordinates provided by the resizing map, thereby constructing resized image I1'.

This relieves the processor of the processing burden of executing processor-executable instructions to resize images captured in the online image registration process.

Distortion correction LUT 317 is likewise configured to correct distortion with a distortion correction map during the offline calibration process. In the online image registration process, distortion correction LUT 317 maps respective pixel coordinates of a source image to corresponding respective output pixel coordinates provided by the map, thereby establishing the functional relationship that defines a distortion-corrected, resized source image, regardless of the image content of the source image.

Accordingly, in the online image registration process, processor 310 determines output pixel coordinates corresponding to the input pixel coordinates provided by the distortion correction map of LUT 317. Processor 310 copies pixel intensity values from the input pixel coordinates of image I1' provided by the resizing map, to the respective corresponding output pixel coordinates provided by the resizing map, thereby constructing distortion-corrected, resized image I1".

In some implementations, resizing LUT 330 and distortion correction LUT 317 can be arranged such image I1 is corrected for distortion before being resized.

In the example of FIG. 3, resampling LUT 315 is likewise configured with a resampling map during the offline calibration process. In the online image registration process, resampling LUT 315 maps respective pixel coordinates of a source image to corresponding respective output pixel coordinates provided by the resampling map, thereby establishing the functional relationship that defines a resampled, distortion-corrected, resized source image, regardless of the image content of the source image.

Accordingly, in the online image registration process, processor 310 determines output pixel coordinates corresponding to the input pixel coordinates provided by the resampling map of resampling LUT 315. Processor 310 copies pixel intensity values from the input pixel coordinates of image I1" provided by the distortion correction map of LUT 317, to the respective corresponding output pixel coordinates provided by the resampling map, thereby constructing resampled, distortion-corrected, resized image I1'''.

Once the LUTs comprising image registration device 370 are loaded with their respective maps, they perform the functions encoded in the maps in the same way for every source image. In that sense image registration device 370 performs a blind registration process. In other words, the registration is performed without knowledge of features of images I1, without mapping features, and without any other knowledge of the content of images I1 and/or I2. Indeed, image registration device 370 can register image I1 (or a sequence of images I1) to image I2 (or a sequence of images I2) without processing any I2 images.

The pixel coordinate mapping operations may involve interpolation of at least some pixel intensity values. Thus, whenever an input image is mapped to an output image, some loss of fidelity in the output image can occur.

Therefore, in an alternative implementation of image registration device 370, the maps of LUT 330, 317, 315 are combined into a single map and the single map is loaded into one LUT. This decreases the number of interpolations from three to no more than one. The single LUT configured with the combined map provides a higher quality image and incurs fewer computations than would be incurred by performing three separate mapping operations.

In addition to image registration device 370, apparatus 300 comprises a memory 320, which can be a non-transitory computer-readable storage medium storing processor-executable instructions that configure processor 310 to perform the functions, processes and methods described herein.

In an example vehicle implementation, processor 310 can be communicatively coupled to memory 320 and image registration device 370 by a common electrical communication bus included in network 114 (FIG. 1). In other implementations apparatus 300 may be provided as a stand-alone device that may be disposed within a suitable housing fitted with input/output ports for cooperative intercommunication between components of apparatus 300 (including, e.g., memory 320) and components of vehicle 10 receiving images from frame buffers 350 and 360 and providing multispectral images for rendering on display device 378. In those implementations, an electrical communication bus 106 may include a printed circuit board interconnections and/or wired or wireless interconnections between the components of apparatus 300 enclosed with a housing.

In some implementations, one or more components and/or functions of apparatus 300 may be distributed among components of vehicle system 100 and configured for cooperative intercommunication via network 114. Components of apparatus 300 can include communication ports for sending and receiving data and/or commands to and from external devices such as display device 378, frame buffers 350, 360, components 110 of vehicle system 100 and cameras 250 and 260 via network 114.

Frame buffers 350 and 360 comprise memory cells arranged to store arrays of respective intensity values that correspond to respective sensing elements (sensels) of the cameras 250, 260 respectively as frames. For example, as noted above, pixels of arrays corresponding to camera 250 can visually represent infra-red scene energy by an eight-bit gray code value. Pixel positions in an array are specified by x, y coordinates in a camera coordinate system.

As used herein the term 'frame buffer' refers to a physical area of a memory such as a random-access memory (RAM) configured to store arrays of pixel intensity values provided by a corresponding camera. The term 'buffer' refers to the use of the memory to temporarily store or 'buffer' the arrays of pixel intensity values as they are provided in real time by the corresponding camera. Processor 310 is configured to read frame buffers 350 and 360 to acquire successive respective frames of pixel values, or rasters, provided by cameras 250 and 260 respectively, e.g., as streams of video frames.

In an example use of apparatus 300, image registration device 370 receives frames of non-calibration images provided by whichever of cameras 250 and 260 has the lowest resolution. In the example implementations described herein, the lowest resolution camera is camera 250. Accordingly, frames stored in frame buffer 350 of camera 250 are provided to image registration device 370. Image registration device 370 operates on the input frames without reference to the images captured by camera 260 and stored in frame buffer 360.

In some implementations, apparatus 300 further includes a blending LUT 313. Blending LUT 313 can be loaded with a blending map encoding a blending function that fuses registered images I1" to corresponding images I2 form multispectral images. The output of blending LUT 313 may be a stream of multispectral images 13.

In some implementations, image registration device 370 provides real-time image processing capability to apparatus 300. In the context of this disclosure, 'in real time' means within a frame refresh rate, or in synchronization or correspondence with the frame refresh rate of both imagers. Thus, processor 310 can register images at least within one frame refresh period of cameras 250, 260.

The real time registration capability is achieved at least in part by encoding transforms and functions in mappings and loading the mappings to LUTs 330, 315 and 317. As described above, encoding the mapping functions in the LUTs relieves processor 310 of the burden of executing processor-executable instructions to perform these functions. Processor 310 can register the images by providing frames from frame buffer 350 as inputs to an LUT. The LUT maps the input frames to output frames to achieve the same functional result as would be provided by processor 310 executing processor executable instructions to perform the mapping functions on the input frames.

In an example implementation, camera 250 provides arrays (rasters) to frame buffer 350 at a frame refresh rate of 30 Hz or 30 frames per second. A raster corresponds to an array of pixel values provided by an array of sensels of a camera's sensor. In one example implementation, frame buffer 350 is refreshed in synchronization with refreshing of frame buffer 360. In an example implementation the refresh rates of frame buffers 350 and 360 are 30 Hz or 30 frames per second. In one example implementation frame buffer 350 and frame buffer 360 synchronized to refresh within +/−17 milliseconds (ms) of each other.

In some implementations display device 378 is a transparent display (TD) comprising a portion of a windshield 295 of vehicle 10 (best illustrated in FIG. 2). For example, display device 378 may comprise an augmented reality (AR) display or a head up display (HUD) that projects information onto windshield 295 for viewing by vehicle occupants. In other implementations, display device 378 can comprise a display device disposed, e.g., in a console of vehicle 10.

Resampling LUTs

Figure 4:
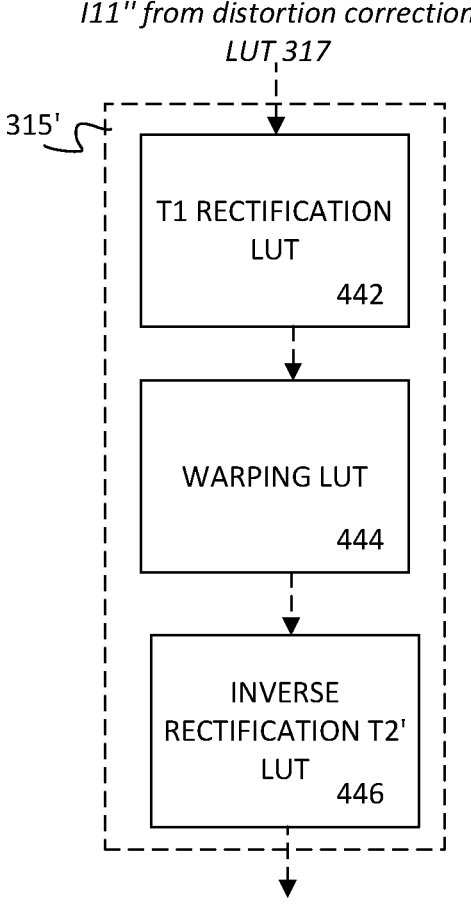
FIG. 4 is a block diagram of an alternative implementation of the resampling LUT shown in FIG. 3.

FIG. 4 is a block diagram of an alternative implementation LUT 315' of resampling LUT 315 shown in FIG. 3. In the example of FIG. 4, resampling LUT 315' comprises a rectification LUT 442, a warping LUT 444 and an inverse rectification LUT 446. Rectification LUT 442 is loaded with a rectification map generated at blocks 1319 and 1320 of offline method 1300 shown in FIG. 13A. The rectification map configures rectification LUT 442 to map Cartesian coordinates of pixels of distortion-corrected, resized image I1" provided by distortion correction LUT 317, to polar coordinates thereby providing a rectified, distortion-corrected resized image $I1^R$ at its output.

Warping LUT 444 is loaded with a warping map generated in offline calibration method 1300 shown in FIG. 13 at blocks 1332, 1334. The warping map encodes a best fit polynomial function that was applied during the offline calibration method described below to determine a pixel offset for each pixel of a rectified first calibration image to warp the first calibration image to a second calibration image. The warping map generated in the offline process configures LUT 444 to apply the same pixel offset to pixels of rectified, distortion-corrected, resized image non-calibration image $I1^R$ in the online process. Accordingly, warping LUT 444 is configured to provide a warped, rectified, distortion-corrected, resized image $I1^W$ at its output.

Inverse rectification LUT 446 is loaded with an inverse transform mapping that encodes an inverse rectification transform T2' generated in the offline calibration method 1300 shown in FIG. 13 at blocks 1338, 1340. The inverse transform mapping configures inverse rectification LUT 446 to convert the polar pixel coordinates of warped, rectified, distortion-corrected resized image $I1^W$ to the Cartesian coordinate system of image 12 as captured by camera 260 thereby provide a warped, distortion-corrected resized image I1'" that is registered to image 12.

Selectable Resampling LUTs

Fidelity is determined by the specific calibration data chosen to determine the resampling mapping, as well as by distance to the calibration target and the location of the target in the field of view (FOV) of cameras 250, 260. Non calibration images captured by cameras 250, 260 will be optimally registered when the distance separating vehicle 10 from the scene objects is about the same as the distance that separated the cameras from the calibration target in the offline registration process. This means there may be perceivable differences in registration error in the images registered in the online process depending on the distance separating the vehicle 10 from various scene objects. To compensate for this effect in an example implementation, apparatus 300 includes more than one resampling LUT as illustrated in FIG. 5.

Figure 5:
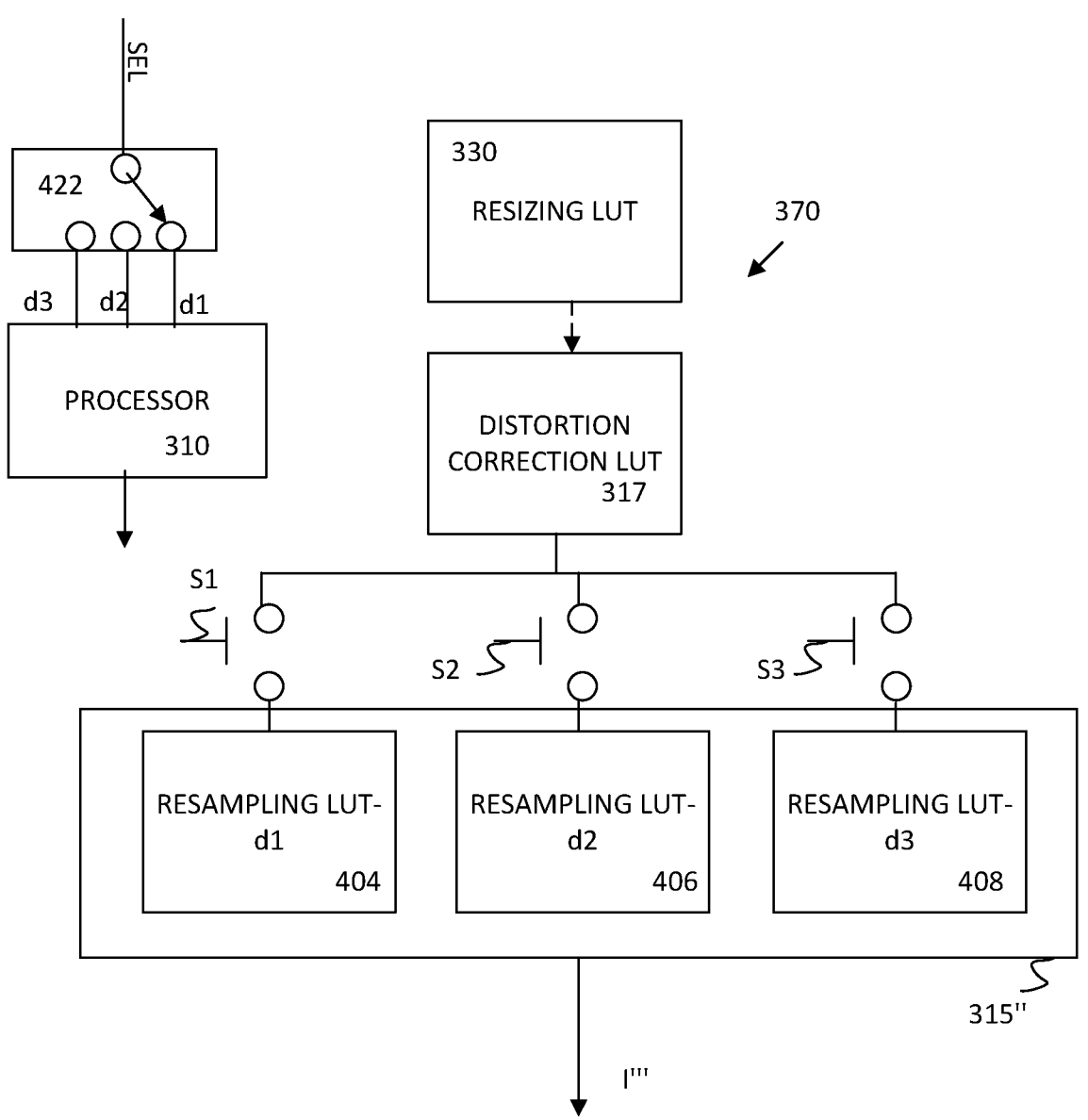
FIG. 5 is a block diagram of an example implementation of the apparatus shown in FIG. 3.

FIG. 5 is a block diagram of another example implementation of apparatus 300. In the example configuration illustrated in FIG. 5, apparatus 300 further comprises at least one additional resampling LUTs, in this case three additional resampling LUTs; resampling LUT d1 indicated at 404, resampling LUT d2 indicated at 406 and resampling LUT d3 indicated at 408.

Apparatus 300 further includes a switch 422 coupled to processor 310. Other implementations could have two resampling LUTs, or more than three resampling LUTs. Switch 422 can be, e.g., a single throw, triple pole switch or an equivalent is operable to indicate to processor 310 selection of one of LUT d1 404, LUT d2 406 and LUT d3 408.

In response to receiving a selection indication from switch 422, processor 310 activates a corresponding one of switches S1, S2 and S3 to couple the output of distortion correction LUT 317 to the corresponding one of resampling LUT 404, 406 and 408. The selected resampling LUT comprises resampling LUT 315" of image registration device 370. The output of the selected resampling LUT is resampled, distortion-corrected resized image I1" as shown in FIG. 3.

In some implementations, switch 422 comprises a user interface by which a user, e.g., a vehicle occupant can select one of the plurality of resampling LUTs based on user criteria such as perception of average distance or user preference for the performance of one LUT over another.

In some implementations, processor 310 is configured to receive ranges (distance measurements) from a ranging sensor 318 (best illustrated in FIG. 3) such as light distance and ranging imager (LIDAR), radio frequency distance and ranging (RADAR) or other suitable ranging imager. Processor 310 is configured to compute the average distance between vehicle 10 and objects in the environment surrounding vehicle 10 based on the data received from ranging sensor 318.

Processor 310 is configured to select one of resampling LUTs 404, 406 and 408 to perform the resampling function of resampling LUT 315 based on the distance information. For example, when the average distance separating vehicle 10 from objects in the environment surrounding vehicle 10 is about 5 meters or less, resampling LUT d1 404 may be selected. When the average distance separating vehicle 10 from objects in the environment surrounding vehicle 10 is between about 5 meters and about 15 meters, resampling LUT d2 406 may be selected. When the average distance separating vehicle 10 from objects in the environment surrounding vehicle 10 is greater than about 15 meters, resampling LUT d3 408 may be selected.

Of the plurality of different resampling LUTs, an LUT corresponding to a current environment of vehicle 10 can be selected by comparing sensed average distance from vehicle 10 to objects in the environment, to the different distances and/or angles corresponding to respective ones of the resampling LUTs. Of the plurality of resampling LUTs, the LUT with a distance and/or angle most closely matched to the sensed distance and/or angle can be selected to perform the resampling blocks of method 800. The LUT selection can be automatic, i.e., programmed, or manual, i.e., selected by the user.

The sensed distance to the objects in the environment can be provided by a ranging sensor 318 (illustrated in FIG. 3) which can be a LIDAR sensor of a vehicle 10 perception system. The sensed distance can be provided by other vehicle sensors such as those implemented by GPS systems, cellular networks, and the like. For example, a GPS system can determine the location of vehicle 10, and processor 310 can locate vehicle 10 using available mapping data. The mapping data can be stored on vehicle 10, or processor 310 can acquire mapping data from a cloud-based server via WAN 116 (FIG. 1). Processor 310 can determine which LUT of the three LUTs to select based on the environment, e.g., urban, rural, indicated by the mapping data.

In other implementations, monocular depth estimation using machine learning and unsupervised training (e.g., Monodepth2) can be used to generate a pixel-by-pixel range map for the images acquired by either or both cameras 250, 260. Distance information gathered by monocular depth algorithms can be provided to processor 310. Processor 310 can be configured to select one of the plurality of LUTs for use considering the distance information.

Correction of Display Gamma Curve

Figure 6:
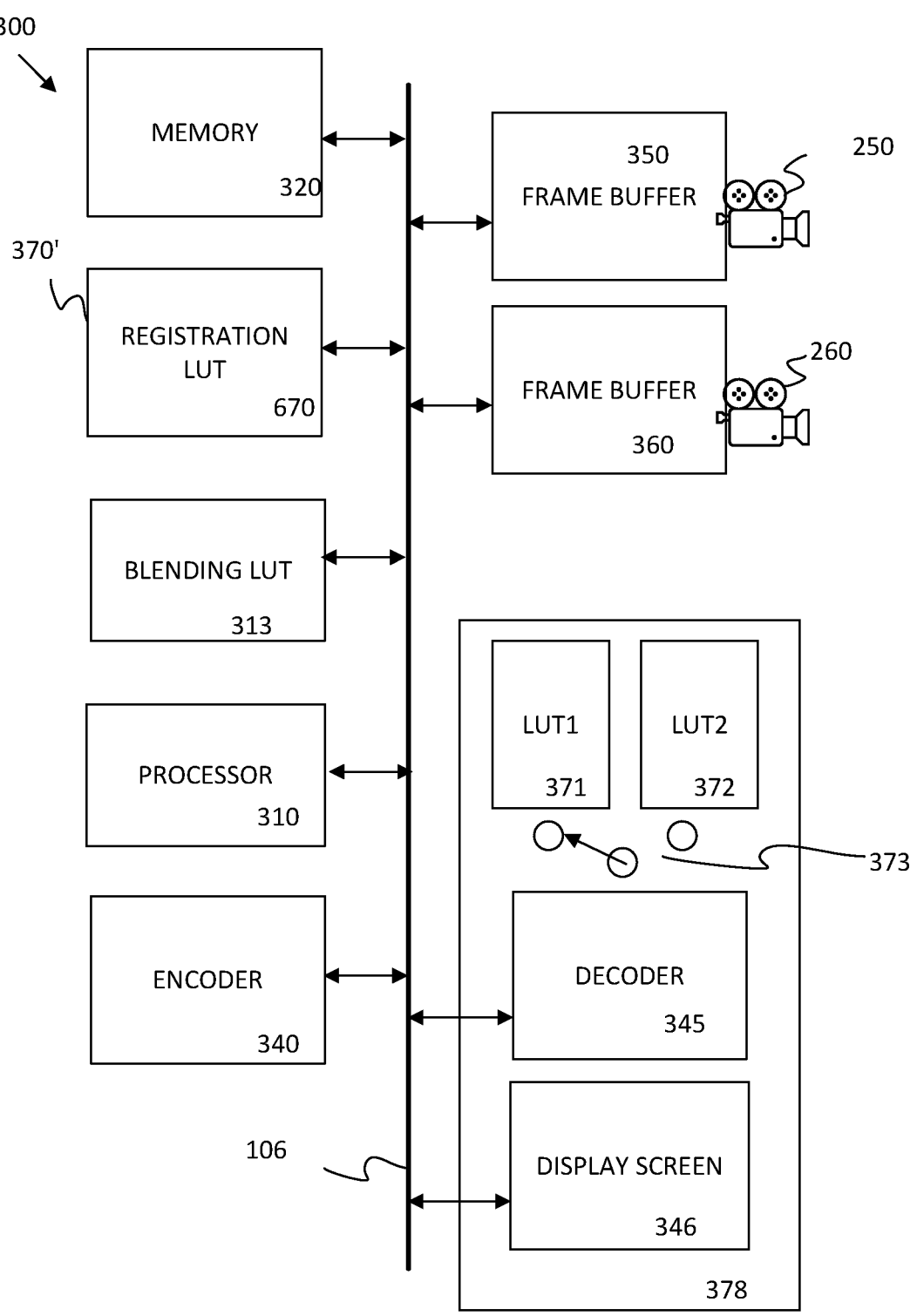
FIG. 6 is a block diagram of an alternative implementation of the apparatus shown in FIG. 3.

FIG. 6 is a block diagram of another example implementation of the apparatus shown in FIG. 3. In the implementation of FIG. 6 image registration device 370' of apparatus 300 comprises an image registration LUT 670. Image registration LUT 670 is configured with a single image registration map that combines the mappings provided by LUTs 330, 317 and 315 in the example image registration device

370 illustrated in FIG. 3. Image registration LUT may perform a pixel intensity value interpolation process when copying pixel intensity values from pixel coordinates of an input non-calibration image I1 to output pixel coordinates to provide registered output image I1'''. Because only one pixel coordinate mapping is performed to register non-calibration input image I1 to non-calibration image 12, the pixel intensity value interpolation process is performed no more than once. Compared to implementations in which more than one pixel intensity value interpolation process is performed to register the images using more than one LUT mapping, the registered image provided by LUT 670 may suffer less degradation in image quality.

Apparatus 300 further includes an encoder 340. Display device 378 includes a corresponding decoder 345 including a switch 373 and two gamma curve correction LUTs 371, 372.

Encoder 340 compresses the stream of multispectral images provided at the output of blending LUT 313 so that they use less vehicle network bandwidth. Encoder 340 encodes the multispectral video stream in real time in accordance with the H.264 video encoding standard. In other implementations encoder 340 can encode the video stream in accordance with other standards, e.g., H.265, VP9, and AV1.

Encoder 340 is configured to recognize areas of the video images containing the IR spectral content and areas of the video images containing the RGB spectral content. Encoder 340 encodes the IR spectral content at a higher encoding bit rate than it encodes the RGB spectral content. When the encoded image stream is decoded by decoder 345 of display device 378, the IR areas are rendered with a higher resolution than the RGB areas are rendered.

In some implementations encoder 340 includes an ambient light sensor. In other embodiments encoder 340 is configured to receive ambient lighting signals from one or both of cameras 250, 260. In either approach, encoder 340 is configured to encode areas of the multispectral image stream representing IR imager spectral content at a different encoding bit rate than it uses to encode areas of the multispectral image stream representing RGB imager spectral content. Which spectral content is encoded at a higher rate is based on ambient lighting conditions. In one example implementation, in high ambient light conditions, encoder 340 uses a higher bit rate to encode areas of the images representing the IR spectral content at a higher bit rate than it encodes areas of the image representing the RGB spectral content. This is because RGB sensors perform well in high ambient lighting conditions as compared to the IR sensors. In lower ambient lighting conditions, encoder 340 is configured to encode areas representing the RGB spectral content at a higher bit rate than it encodes the areas representing the IR spectral content. This is because RGB sensors do not perform as well as IR sensors in low ambient light conditions.

In another example implementation encoder 340 is configured to encode video streams captured during high ambient light conditions at a lower bit rate than is used to encode video streams captured during low ambient lighting conditions. In another example implementation, encoder 340 is configured to control the bitrate based on time of day. For example, encoder 340 calculates an overall average bit rate in a twenty-four-hour period as the bit rate budget. Encoder 340 is configured to allocate the bitrate budget on an hour by hour, basis. During daylight hours, the bit rate is lower than it is during night-time hours, while the average bit rate over a twenty-four-hour period remains the same.

In one implementation apparatus 300 is configured to cooperate with display device 378 to apply a first gamma correction to the IR image spectral content and a second gamma correction to the RGB image spectral content to enhance the visibility of the IR image spectral content in the multispectral images.

The gamma adjustment LUT is disposed in display device 378 and arranged to cooperate with a display processor (not separately depicted) to adjust the display gamma in accordance with the gamma adjustments specified by the gamma adjustment LUT.

Processor 310 is configured to provide a gamma LUT identifier corresponding to the to the gamma adjustment LUT to encoder 340. Encoder 340 is configured to encode the gamma LUT identifier in the stream of multispectral image frames provided to decoder 345 of display device 378. Display device 378 may be provided with more than one gamma curve correction LUT, e.g., gamma LUT 371 and gamma LUT 372.

Decoder 345 decodes the encoded stream, recovers the gamma LUT identifier, and converts the encoded stream of multispectral image frames to a display format such as HDMI for rendering on a display screen 346 of display device 378. Decoder 345 provides the recovered gamma curve correction identifier to the processor of display device 378. The processor of display device 378 uses the gamma LUT identified by the identifier to select one of gamma LUT 371 and gamma LUT 372 for adjusting the gamma curve of display device 378. Accordingly, the IR portions of the multispectral image are rendered in accordance with a gamma that differs from the gamma used to render the RGB portions of the multispectral images.

Real-time Online Image Registration

FIG. 7 is a flowchart of an online method 700 for real-time registration of (non-calibration) images captured by spatially and spectrally disparate video cameras 250, 260. In the example method illustrated in FIG. 7, video camera 250 is an LWIR video camera having a lower pixel resolution than that of video camera 260. In this example video camera 260 is an RGB camera. In an example application, video cameras 250, 260 (shown in FIGS. 2 and 3) are mounted to a vehicle such as vehicle 10 as shown in FIGS. 1 and 2. Video cameras are positioned and oriented to simultaneously capture non-calibration images of the same scenes within in their respective fields of view (FoV) of the environment surrounding vehicle 10 during routine driving operation of vehicle 10. Camera 250 provides captured images I1 comprising frames of pixel intensity values to frame buffer 350, where they are buffered for processing in accordance with method 700.

At block 702, processor 310 receives a first image I1 comprising a first frame of pixel values, e.g., from frame buffer 350 (shown in FIG. 3).

At block 704 processor 310 provides pixel coordinates of image I1 to a resizing LUT 330. Resizing LUT 330 is configured with a resizing map encoding a resizing function that scales input images in accordance with the following relationship:

$$S(x,y)=\text{IFoV calibration image } I12/\text{IFoV calibration image } I11 \tag{1}$$

where IFoV of a calibration image is given by pixel pitch (center to center distance between sensels on the camera imager)/focal length. This is equivalent to the center-to-center distance of squares on the calibration target/apparent distance of the imaged calibration target from the camera.

Accordingly, resized output images I1' will have an IFoV that is the same as the IFOV of corresponding images I2 provided by camera 260.

The resizing map relates output pixel coordinates defining a resized calibration image captured by video camera 250 in an offline calibration process, to corresponding source input pixel coordinates.

At block 706 processor 310 constructs resized image I1' based on pixel intensity values of image I1 and the output pixel coordinates provided by resizing LUT 330.

At block 708 processor 310 provides pixel coordinates of resized image I1' to distortion correction LUT 317. Distortion correction LUT 317 is configured with a distortion correction map that relates pixel coordinates of a source image, i.e., resized image I1' to pixel coordinates of a distortion-corrected resized image I1".

At block 710 processor 310 constructs distortion-corrected resized image I1" based on the pixel intensity values of resized image I1' and the distortion correction map provided by LUT 330.

At block 712 processor 310 provides pixel coordinates of distortion-corrected, resized image I1" to resampling LUT 315. Resampling LUT 315 is configured with a single resampling map that encodes a rectification transform, a warping function and an inverse rectification transform.

At block 714, processor 310 constructs resampled, distortion-corrected, resized image I1'" based on pixel intensity values of distortion-corrected, resized image I1". Resampled, distortion-corrected, resized image I1'" is registered to image I2.

At block 716, processor 310 provides resampled, distortion-corrected, resized image I1'" at an output of registration device 370 and the method ends.

Figures 8A, 8B:
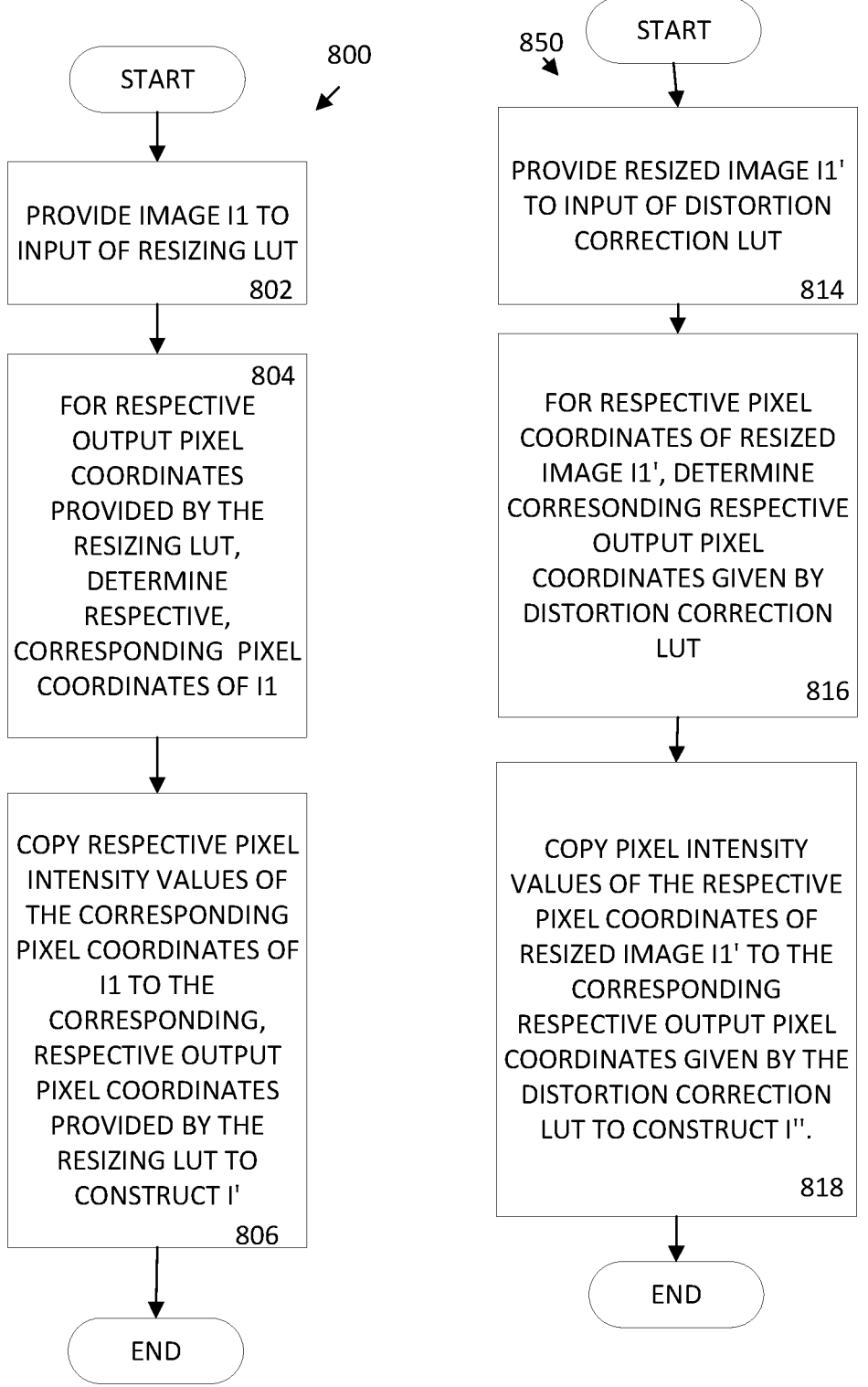
FIG. 8A is a flowchart of a resizing method for use in the method shown in FIG. 7.
FIG. 8B is a flowchart of an image distortion correction method for use in the method shown in FIG. 7.

FIG. 8A is a flowchart of a method 800 for constructing resized image I1' for block 706 of method 700.

At block 802, processor 310 provides pixel coordinates for input image I1 to resizing LUT330.

At block 804, for respective output pixel coordinates given by resizing LUT 330 processor 310 identifies corresponding respective pixel coordinates of image I1.

At block 806 processor 310 copies respective pixel intensity values from the corresponding respective pixel coordinates of I1 to the corresponding respective output pixel coordinates given by resizing LUT 330, thereby constructing resized image I1' and the method ends.

Processor 310 is further configured to correct distortion in resized image I1' to provide a distortion-corrected resized image I1" as illustrated in the flowchart of FIG. 8B.

FIG. 8B is a flowchart of a method 850 for constructing a distortion-corrected, resized image I1" for use in block 710 of method 700.

At block 814, processor 310 provides pixel coordinates of resized input image I1' to distortion correction LUT 317.

At block 816, for respective pixel coordinates of resized image I1', processor 310 determines corresponding respective output pixel coordinates provided by the distortion correction map of distortion correction LUT 317.

At block 818, processor 310 copies pixel intensity values from the respective input pixel coordinates of resized image I1' to the corresponding respective output pixel coordinates provided by the distortion correction map of LUT 317 and the method ends.

After performing method 850 the intensity values of the output pixel coordinates comprise distortion-corrected, resized input image I1'".

FIG. 9 is a flowchart of a method 900 for resampling distortion-corrected, resized image I1".

At block 902 processor 310 provides pixel coordinates of distortion-corrected, resized image I1" to resampling LUT 315. Resampling LUT 315 is configured with a resampling map generated in the offline process described below and resampling LUT 315 is configured with the resampling map in the same offline calibration procedure.

At block 904, for respective pixel coordinates of distortion-corrected, resized image I1". processor 310 determines corresponding respective output pixel coordinates given by the resampling map.

At block 906, processor 310 copies respective pixel intensity values from respective pixel coordinates of distortion-corrected, resized image I1" to the corresponding respective output pixel coordinates provided by resampling LUT 315, thereby constructing a resampled, distortion-corrected, resized image I1". At this block of the method, resampled, distortion-corrected, resized image I1" is registered to image I2 captured by camera 260. This method can be performed online in real time without processing any I2 images.

At block 908, processor 310 provides the resampled, distortion-corrected, resized image I1" at an output of image registration device 370 and the method ends.

Figure 10:
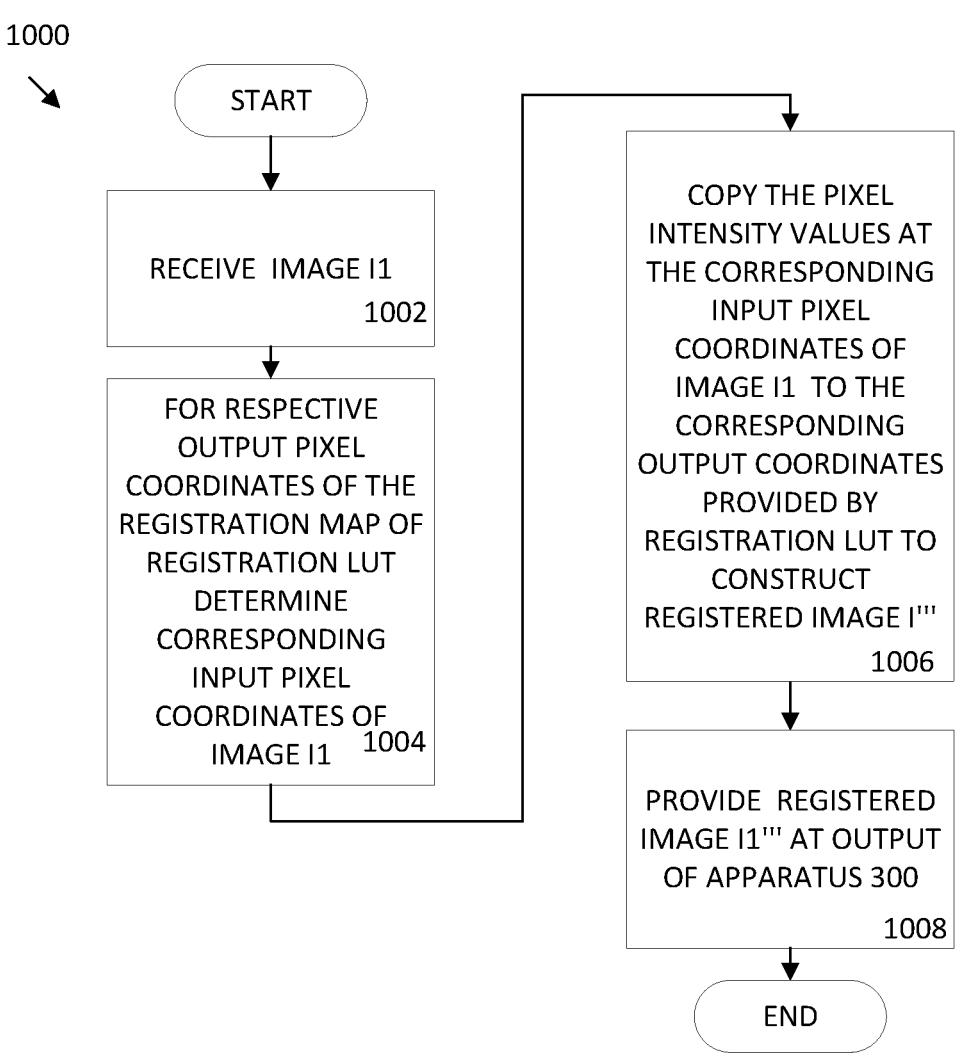
FIG. 10 is a flowchart of an online image registration process.

FIG. 10 is a flowchart of an online registration method 1000 performed using a single registration LUT configured by the offline calibration method of FIG. 13A and FIG. 13B, e.g. blocks 1346, 1348.

At block 1002 processor 310 receives image I1 and provides pixel coordinates of image I1 to the registration LUT (see, e.g., LUT 670 shown in FIG. 6). The registration LUT is configured with registration map that provides a mapping of output pixel coordinates established by a registered calibration image generated in the offline calibration process, to pixel coordinates of a source image to be registered, e.g., source image I1.

At block 1004, for corresponding respective output coordinates provided by the registration LUT, processor 310 determines corresponding respective input pixel coordinates of image I1 by looking up the corresponding pixel coordinates in the LUT.

At block 1006, for respective pixel coordinates of the first image, processor 310 copies corresponding respective pixel intensity values to the respective corresponding output pixel coordinates provided by the registration LUT, thereby constructing registered image I1".

At block 1008, processor 310 provides registered image I1" to an output of apparatus 300 and the method ends.

Offline Calibration Process

Figure 12:
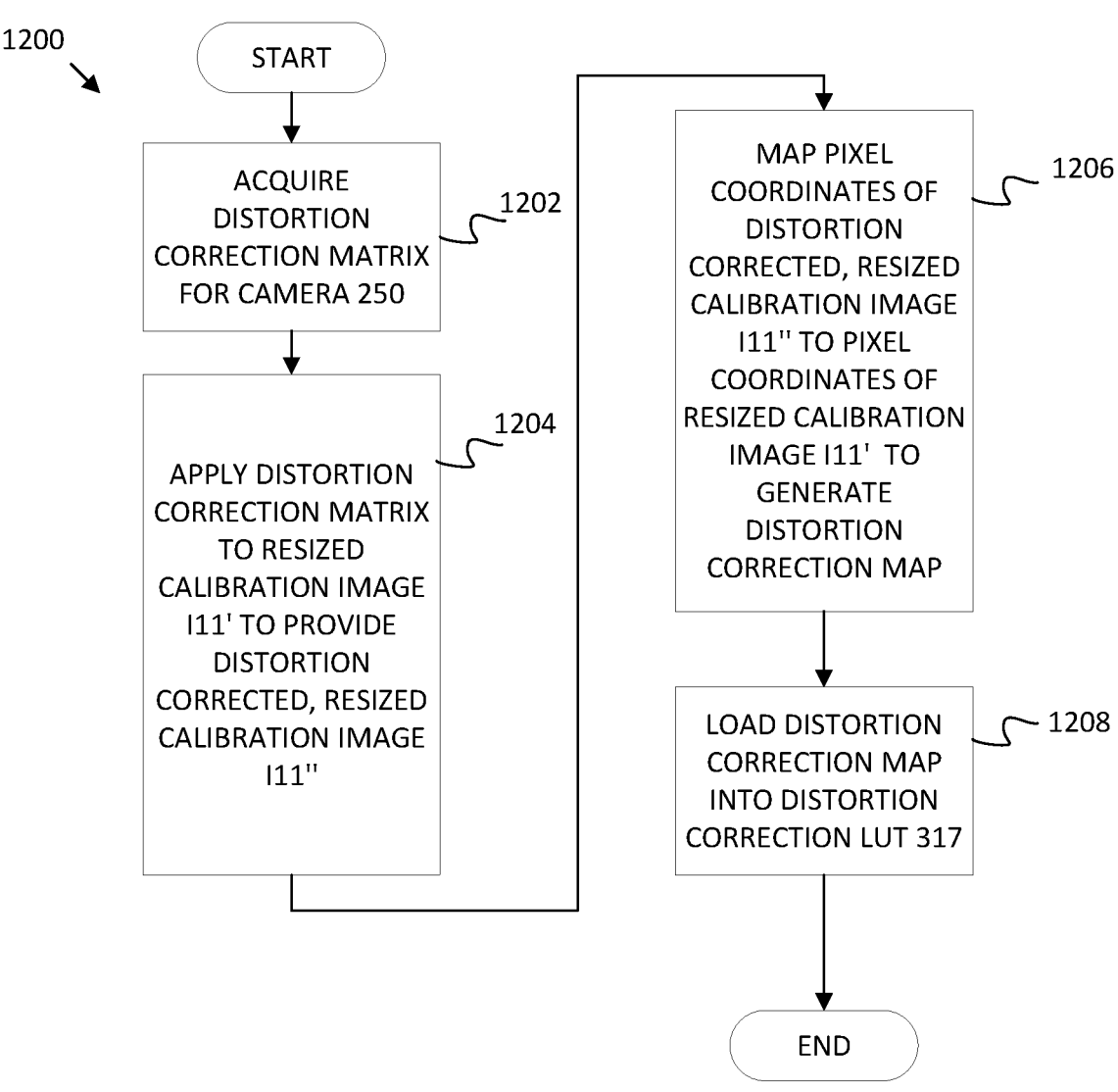
FIG. 12 is a flowchart of a method for generating a distortion correction map.

FIGS. 11-13 are flowcharts of offline calibration methods performed to configure image registration device 370 for online image registration. Processor 310 performs the offline image registration methods using cameras 250 and 260 to capture first and second sequences of calibration images I11 and I12. A calibration image is an image of a calibration target, e.g., a structure displaying black and white squares in a checkerboard pattern (See, e.g., FIGS. 14A-D). The checkerboard pattern is used for the calibration because its regular grid structure provides distinctive features that can be easily detected and matched in captured images.

The black and white squares of the checkerboard calibration target have corners (feature points) with known geometric relationships. Processor 310 detects the feature points in calibration images I11 and I12 and establishes correspondences in calibration images I11, I12 based on the feature points. Processor 310 can estimate the intrinsic and extrinsic parameters of cameras 250, 260 based on the correspondences. The intrinsic and extrinsic camera patterns are used, e.g., to determine the resizing factor for generating the resizing map described below with respect to FIG. 8 as well as for generating the lens distortion corrections for generating the distortion correction map described below with respect to FIG. 9.

In an example implementation of the offline calibration process, camera 250 and camera 260 are mounted on a vehicle in a fixed relationship to one another on a vehicle, e.g., vehicle 10 shown in FIGS. 1 and 2. The vehicle used to perform the offline calibration process can be an automobile. The automobile and cameras used to perform the offline calibration process can be the same automobile and cameras used to perform the online registration method according to the example of FIG. 7 to register non-calibration images.

The vehicle used for capturing and processing calibration images I11, I12 in the offline process described herein is not necessarily an automobile. Suitable vehicles include a variety of types of vehicles. For example, the vehicle can be any movable platform or cart to which cameras 250 and 260 are mounted in a fixed relationship to perform the offline calibration process. After the calibration is performed using the movable platform in the offline process, cameras 250 and 260 (or their equivalents) can be mounted in the same fixed relationship on a different vehicle, e.g., an automobile.

Prior to performing the offline calibration, the checkerboard calibration target is affixed to a support structure. Suitable support structures include, e.g., internal walls of buildings. This would be suitable for implementations in which a cart or movable platform will be used to carry cameras 250, 260. Suitable support structures can also include external faces of buildings. This would be suitable in implementations in which an automobile will be used to carry cameras 250 and 260.

The vehicle carrying cameras 250 and 260 is moved from a distal (far) position with respect to the calibration target to a proximal (near) position with respect to the calibration target. The proximal and distal distances from the calibration target can vary by application. In one example application the distal (far) distance is about 15 meters, and the proximal (near) distance is about 5 meters. The vehicle may be moved toward the calibration target as well as away from the calibration target, and the movements may be repeated any number of times. As the vehicle moves cameras 250, 260 capture sequences of images I11, I12 respectively of the calibration target. In one example, cameras 250, 260 capture images at a motion video frame rate, e.g., 30 Hz.

The sequences of calibration images I11 and I12 captured in this process may be stored or buffered in a memory and subsequently used by processor 310 in the offline calibration process to register calibration images comprising sequence of calibration images I11 to calibration images comprising sequence of calibration images I12. The goal of performing image registration on images I11 and I12 in the offline calibration process is not to register the images, per se. The goal is to generate the pixel coordinate maps used to configure image registration device 370 to register non calibration images in the real-time online image registration process as described in the example of FIG. 7. In the online registration process, image registration device 370 replaces the computationally complex and time-consuming functions performed by processor 310 executing processor executable instructions to register the calibration images, with one or more simpler and less complex array indexing operations that can be performed using image registration device 370 in a real-time in the online image registration process.

FIG. 11 is a flowchart of an offline method 800 for generating a resizing map for configuring resizing LUT 330.

Method 800 is performed offline. In method 800 cameras 250 and 260 capture sequences of images of a calibration target to provide sequences of calibration images I11 and I12, respectively.

At block 1102 processor 310 executes instructions to determine intrinsic parameters of camera 250.

At block 1104 processor 310 executes instructions to determine intrinsic parameters of camera 260. The intrinsic parameters may include field of view (FoV), instantaneous field of view (IFoV), spatial extent, spatial resolution, and pixel density or pitch. These may be specified by the camera manufacturers and stored in a memory to be used by processor 310 in performing method 800. Alternatively, the intrinsic camera parameters can be determined by performing a camera calibration process and storing the intrinsic parameters before performing the offline registration calibration process described herein. Suitable camera calibration processes are well known and are therefore not described in detail herein.

At block 1106, processor 310 executes instructions to compute a scaling factor for resizing calibration image I11. The scaling factor is given by;

$$S(x,y) = \text{IFoV calibration image } I12/\text{IFoV calibration image } I11 \qquad (2)$$

where IFoV of a calibration image is given by pixel pitch (center to center distance between sensels on the camera imager)/focal length. This is equivalent to the center-to-center distance of squares on the calibration target/apparent distance of the imaged calibration target from the camera. At block 1108 processor 310 executes instructions to resize input calibration image I11 in accordance with the scaling factor to provide resized calibration image I11' at an output. Resized calibration image I11' will have an IFOV that is the same as the IFoV of calibration image I12. (See, e.g., FIGS. 14A-14D). In the example implementation, 'the same' means, within about 1%. In other implementations, 'the same' means a variation within about 2%.

At block 1110, processor 310 executes instructions to calculate an input (source) pixel coordinate for each pixel of the output (resized) calibration image I11' based on the scaling factor to generate a resizing map. The resizing map is an output pixel coordinate to input pixel coordinate map that encodes the resizing function performed by processor 310 by executing instructions. The map encodes the function as a functional relationship between output pixel coordinates and input pixel coordinates.

At block 1112 processor 310 executes processor executable instructions to load the resizing map into resizing LUT 330 thereby configuring LUT 330 to provide an output image whose pixel coordinates have the functional relationship defined by the resizing map with the pixel coordinates of the input image.

Thereafter, in the online image registration process LUT 330 processor 310 (or another suitable processor) can provide a non calibration image captured by camera 250 to the input of resizing LUT 330. Processor 310 then iterates through each output pixel coordinate of the resizing map and looks up the corresponding input pixel coordinate in the map. Processor 310 identifies that input pixel coordinate in the input non-calibration image and copies the pixel intensity value from that pixel coordinate to the output pixel coordinate, thereby constructing resized calibration image I11' at the output of LUT 330. In that manner, resizing LUT 330 replaces the resizing function performed by processor 310 executing processor executable instructions in the offline image registration process, with a less complex and faster array indexing operation in the online image registration process.

FIG. 12 is a flowchart of an offline method 1200 for generating a distortion correction map for configuring distortion correction LUT 317.

At block 1202 processor 310 receives a distortion correction matrix for camera 250

At block 1204 processor 310 executes processor executable instructions to apply the distortion correction matrix to resized calibration image I11' to provide a distortion-corrected resized calibration image I11".

At block 1206 processor 310 maps pixel coordinates of resized calibration image I11' to corresponding respective pixel coordinates of distortion-corrected, resized calibration image I11" to generate a distortion correction map.

At block 1208 processor 310 loads the distortion correction map to distortion correction LUT 317, and the method ends.

FIGS. 13A and 13B provide a flowchart of an offline method 1300 for generating a resampling map and for configuring LUT 315 with the resampling map.

At block 1302 processor 310 receives a sequence of distortion-corrected, resized calibration images I11".

At block 1304 processor 310 receives a sequence of corresponding distortion-corrected, resized calibration images I12".

At block 1306 processor 310 detects the calibration target in distortion-corrected, resized calibration images I11".

At block 1308 processor 310 detects the calibration target in the corresponding distortion-corrected, resized calibration images I12".

At block 1310 processor 310 identifies correspondences between points or features of the calibration target detected in the sequence of distortion-corrected, resized calibration images I11" and the sequence of distortion-corrected, resized calibration images I12". Identifying correspondences is a process of establishing matches between points in a pair of images.

At block 1312 processor 310 computes the fundamental matrix (FM) based on the correspondences identified in block 1310.

At block 1314 processor 310 computes a polar rectification transform T1 for the sequence of distortion-corrected, resized calibration images I11" based on the FM computed in block 1112.

At block 1316 processor 310 computes a polar rectification transform T2 for the sequence of distortion-corrected, resized calibration images I12" based on the FM computed in block 1112.

At block 1318 processor 310 applies polar rectification transform T1 to the correspondences in sequence of distortion-corrected, resized images I11" to provide a corresponding sequence of distortion-corrected, resized, rectified images I11$^R$.

At block 1319 processor 310 may map pixels of images distortion-corrected, resized images I11" to pixels of distortion-corrected, resized rectified images I11$^R$ to provide a T1 rectification map. At block 1320 processor 310 may load the T1 polar rectification map to rectification LUT 442 for use in alternative resampling LUT 315' (FIG. 4).

At block 1322 processor 310 applies polar rectification transform T2 to the correspondences in sequence of distortion-corrected, resized images I12" to provide a corresponding sequence of distortion-corrected, resized rectified images 112R. The flowchart continues in FIG. 13B.

At block 1323 processor 310 computes the inverse T2' of polar rectification transform T2.

At block 1324 (FIG. 13B) processor 310 identifies far correspondences in pairs of rectified images I11$^R$ and I12$^R$. Images I11$^R$ and I12$^R$ are a 'pair' if they were captured at the same time, i.e., they have the same timestamp. Far correspondences are correspondence points having relatively large disparities with respect to the image plane.

At block 1326 processor 310 computes polar column horizontal offsets for the far correspondences.

At block 1328 processor 310 determines a best fit polynomial function that fits the pixels of distortion-corrected, resized, rectified image I11$^R$ to pixels of rectified image I12$^R$ based on the horizontal offsets in image I11$^R$. I12$^R$ image pair. The best fit polynomial function is a function that provides coefficients for a warping matrix, which when applied to distortion-corrected, resized, rectified image I11$^R$ gives a horizontal displacement for each pixel x, y of each distortion-corrected, resized, rectified calibration image I11$^R$ from its initial position x, y before warping, to a new position (x+W (x, y), y) in the distortion-corrected, resized, rectified, warped image I11$^W$, where x, y specify pixel position coordinates in which x denotes column number and y denotes row number in the pixel array of I11$^R$ (before warping). The warping function comprises a pair of two-dimensional mapping functions, u(x, y) and v(x, y), which maps pixel positions (x, y) of pixel arrays of images I11$^R$ to new pixel positions (u, v) in the pixel arrays of images I11$^W$.

At block 1330 processor 310 applies the best fit polynomial function to images I11$^R$ to horizontally shift pixels of images I11$^R$ toward the corresponding pixels in images I12$^R$, thereby warping rectified images I11$^R$ to align with rectified images I12$^R$ thereby providing a sequence of distortion-corrected, resized, warped rectified images I11$^W$.

In some implementations, at block 1332 processor 310 may construct a warping map by mapping pixel coordinates of distortion-corrected, resized, rectified images I11$^R$ to pixel coordinates of warped, rectified images I11$^W$ based on the best fit polynomial function determined at block 1328.

In some implementations, at block 1334 processor 310 may load the warping map into to warping LUT 444 (FIG. 4). Thereafter, processor 310 can use warping LUT 444 to map distortion-corrected, resized, rectified non-calibration images I1$^R$ to distortion-corrected, resized, rectified, warped, non-calibration images I11$^W$ in accordance with the best fit polynomial function, without processor 310 executing processor-executable instructions to determine and/or apply the best fit polynomial function in the online image registration process.

In either implementation (FIG. 3 or FIG. 4) at block 1336, processor 310 applies T2' (computed in block 1322) to the distortion-corrected, resized, warped, rectified calibration images I11$^W$ to provide registered calibration images I11'''.

At block 1338 processor 310 may map pixels of distortion-corrected, resized, rectified, warped calibration images I11" to registered calibration images I11".

At block 1340 processor 310 may load the T2' map to inverse rectification LUT 446 to comprise alternative resampling LUT 315' (illustrated in FIG. 4) Thereafter, in an online (runtime) application, processor 310 can perform inverse rectification on distortion-corrected, resized, rectified, warped, non-calibration images I1$^W$ by providing distortion-corrected, resized, rectified, warped non-calibration images I1$^W$ to LUT 446 to provide registered non-calibration images I1''' without processor 310 executing processor-executable instructions to perform the inverse rectification transform T2', and without processor 310 processing any images I2 in the sequence of images I2.

In either implementation, at block 1342 processor 310 can map pixel coordinates of distortion-corrected, resized calibration images I11" to pixel coordinates of registered calibration images I11''' to provide an image resampling map for loading into LUT 315, thereby configuring LUT 315 for online resampling use.

At block 1344 processor 310 loads the image resampling map to image resampling LUT 315 (FIG. 3). Thereafter, in an online (runtime) application, processor 310 can perform resampling of distortion-corrected, resized non-calibration images I1" by providing images I1" to LUT 315 thereby configuring LUT to resample images I1" without processor 310 executing processor-executable instructions to perform the online resampling function, and without processor 310 processing any images in the sequence of images I2.

As illustrated in FIG. 5, in some implementations apparatus 300 can include more than one resampling LUT. For example, processor 310 may provide a resampling LUT d1 that 'focuses' on near objects, a resampling LUT d2 that focuses on intermediate objects and a resampling LUT d3 that focuses on far objects. In this context 'near' can be within about 5 meters of cameras 250, 260. 'Far' can be about 15 meters or more from cameras 250, 260 and 'intermediate' can be anywhere between about 5 meters and 15 meters from cameras 250, 260.

To provide resampling LUT d1 configured to register objects near, e.g., within about 5 meters of cameras 250, 260 better than it registers objects at intermediate of far distances from cameras 250, 260 processor 310 selects a number of images sufficient to span the horizontal and vertical camera field of view, e.g., at least three rectified calibration images from captured image sequence I11 and three corresponding rectified calibration images from captured image sequence I12, that were captured when cameras 250, 260 were within about 5 meters of the calibration target. Processor 310 performs method 700 using those captured images.

Likewise, to provide resampling LUT d2 configured to register objects at 'intermediate' distances, e.g., distances between about 5 meters and 15 meters from cameras 250, 260, processor 310 selects calibration images I11 and I12 that were captured when cameras 250, 260 were between about 5 meters and 15 meters. Processor 310 performs method 700 on those intermediate images.

To provide resampling LUT d3 configured to register objects at 'far' distances, e.g., distances greater than about 15 meters from cameras 250, 260, processor 310 selects calibration images that were captured when cameras 250, 260 were farther than about 15 meters from the calibration target. Processor 310 performs method 700 on those 'far' images.

The LUTs configured with the maps generated by processor 310 performing method 1300 are 'fixed' in the sense they do not change when cameras 250, 260 are subsequently used to capture non-calibration images. The LUTs have no information about scene or image content in the frames of images captured by cameras 250, 260 during subsequent routine (non-calibration) use of the cameras to register non calibration images. Therefore, they do not respond to changes in the scene or image content in any captured frames. In that sense the LUTs are 'blind,' i.e., they blindly perform their mapping functions in the same way on any images they receive without recognizing features and without any information about or reference to image content. Further, in the online (runtime) application, processor 310 does not process any images I2 in the sequence of images I2 to register images I1 to images I2.

In this example implementation, cameras 250 and 260 are spaced such that their image planes do not coincide. Therefore, in this example a polar rectification scheme is applied by processor 310 and the rectified view space is a polar coordinate system. Thus processor 310 maps pixel coordinates of calibration image I11 from coordinates in a Cartesian coordinate system to polar coordinates. As noted above, in implementations in which cameras are closely spaced, the rectified coordinate system could be a planar coordinate system or a cylindrical coordinate system.

Figure 14A:
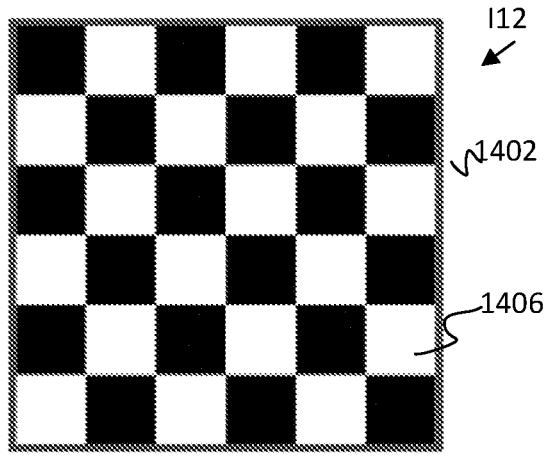
Figure 14B:
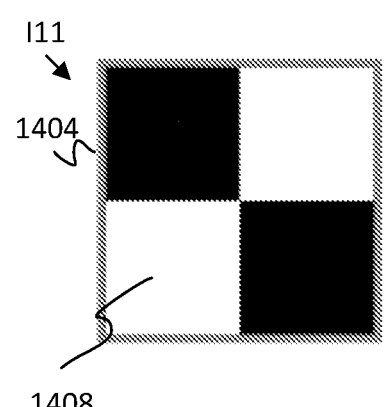
Figure 14C:
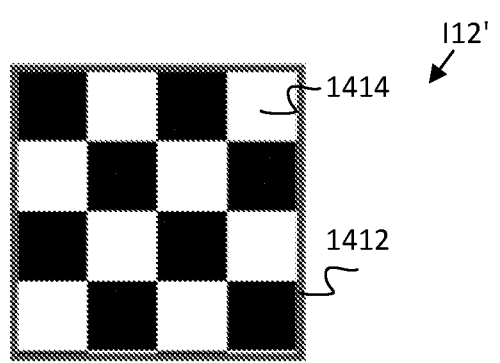

FIG. 14A depicts resizing of an example 6×6 pixel array 1402 comprising a calibration image I12 of a calibration target captured by second camera 260. In the example, one square 1406 corresponds to one pixel. FIG. 14B depicts an example 2×2 pixel array 1404 comprising an input calibration image I11 of the same calibration target captured by first camera 250. One square 1408 corresponds to one pixel. FIG. 14C depicts calibration image I12 cropped to have an area that equals the area of calibration image I11 of FIG. 14B. Cropped calibration image I12' comprises a 4×4 pixel array 1412. A square 1414 corresponds to a pixel.

Figure 14D:
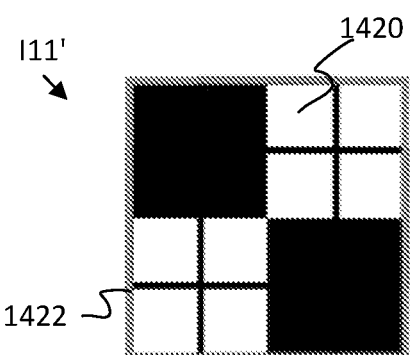

FIG. 14D depicts output image I11' after resizing by processor 310. Resized image I11' comprises a 4×4 array 1422 which is the same as the array size of cropped image I12 in FIG. 14C. Processor 310 mapped each pixel of input image I11 to four pixels (one indicated at pixel 1420) in output image I11.' For white checkerboard squares, processor 310 mapped 4 pixels having white intensity values. For black checkerboard squares, processor 310 mapped 4 pixels having black intensity values. The IFOV of resized image I11' in FIG. 14D is the same as the IFoV of cropped image I12' in FIG. 14C.

Processor 310 creates a mapping between pixels of input calibration image I11 and pixels of output calibration image I11' to provide a resizing map. Processor 310 loads the resizing map into resizing LUT 330. Resizing LUT 330 may then be used to resize non-calibration images captured by first camera 250 in an online image registration process such as that illustrated in FIG. 7.

FIG. 15 is a flowchart of a method 1500 for adjusting a display device gamma curve for a multispectral video stream. At block 1502 processor 310 provides a stream of multispectral images to encoder 340 along with a gamma LUT identifier.

At block 1504 processor 310 encodes the stream including the gamma LUT identifier.

At block 1506 encoder 340 provides the encoded stream of multispectral images including the gamma LUT identifier to decoder 345 and the method ends.

FIG. 16 is a flowchart of a method 1600 for adjusting a display device gamma curve for a multispectral video stream.

At block 1602 decoder 345 receives encoded stream of multispectral images from encoder 340.

At block 1604, decoder 345 decodes the stream and recovers the gamma LUT identifier in the decoded video stream.

At block 1606 decoder 345 selects the gamma LUT identified by the gamma LUT identifier. In one implementation, decoder 345 selects one of gamma LUT1 371 and gamma LUT2 372 based on the identifier.

At block 1608 display device 378 adjusts the display device gamma curve in accordance with the selected gamma adjustment LUT and the method ends.

At block 1610 display device 378 renders the decoded, gamma adjusted video stream on display screen 346 and the method ends.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other non-transitory storage medium from which a computer can read stored data or instructions.

In the drawings, the same reference numbers indicate the same elements. Further, some or all these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It should further be understood that certain steps could be performed simultaneously, that other steps could be added, or that certain steps described herein could be omitted. In other words, the descriptions of processes herein are provided for the purpose of illustrating certain embodiments and should in no way be construed to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. An apparatus comprising:
a processor;
a memory coupled to the processor, the memory including processor executable instructions, which when executed by the processor configure the processor to:
receive a first image of a scene captured by a first camera;
for respective pixel coordinates of a resized calibration image, determine corresponding pixel coordinates of a first calibration image;
for respective corresponding pixel coordinates of the first calibration image, determine respective corresponding pixel coordinates of the first image;
for the corresponding respective pixel coordinates of the first image, copy pixel intensity values of the first image to the corresponding pixel coordinates of the resized calibration image, thereby constructing a resized first image having an instantaneous field of view (IFoV) corresponding to an IFOV of a second image of the scene; and
register the resized first image to the second image captured by a second camera without information about features of the first image and without processing the second image.

2. The apparatus of claim 1, wherein the first calibration image is distortion-corrected, whereby the resized first image is distortion-corrected.

3. The apparatus of claim 2, wherein the processor is further configured to:
for corresponding respective pixel coordinates of a distortion-corrected, resized first calibration image, determine corresponding respective pixel coordinates of the distortion-corrected, resized first image; and
from the corresponding respective pixel coordinates of the distortion-corrected, resized first image, copy pixel intensity values to the respective pixel coordinates of the resampled, distortion-corrected, resized first calibration image, thereby constructing a resampled, distortion-corrected, resized first image registered to the second image.

4. The apparatus of claim 2, wherein the processor is further configured to:
rectify the distortion-corrected, resized first image to provide a rectified, distortion-corrected, resized first image;
warp the rectified, distortion-corrected, resized first image to provide a warped, rectified, distortion-corrected, resized first image; and
inverse rectify the warped, rectified, distortion-corrected, resized first image, thereby constructing a resampled, distortion-corrected, resized first image registered to the second image.

5. The apparatus of claim 4, wherein the processor is further configured to:
copy respective pixel intensity values from corresponding respective Cartesian coordinates of the distortion-corrected, resized first image, to corresponding respective polar pixel coordinates of a rectified, distortion-corrected, resized first calibration image, thereby constructing the rectified, distortion-corrected, resized first image.

6. The apparatus of claim 5, wherein the processor is further configured to:
copy pixel intensity values from respective pixel coordinates of the rectified, distortion-corrected, resized first image to corresponding respective pixel coordinates of a warped, rectified, distortion-corrected resized first calibration image, thereby constructing the warped, rectified, distortion-corrected, resized first image.

7. The apparatus of claim 6, wherein the processor is further configured to:
copy pixel intensity values from the warped, rectified, distortion-corrected, resized first image to corresponding respective pixel coordinates of a warped, distortion-corrected, resized first image to corresponding respective pixel coordinates of the first calibration image registered to a second calibration image, thereby constructing the resampled, distortion-corrected, resized first image comprising the first image registered to the second image.

8. A method, comprising:
receiving a first image of a scene captured by a first camera;
for respective pixel coordinates of a resized calibration image, determining corresponding pixel coordinates of a first calibration image;
for respective corresponding pixel coordinates of the first calibration image, determining respective corresponding pixel coordinates of the first image;
for the corresponding respective pixel coordinates of the first image, copying pixel intensity values of the first image to the corresponding pixel coordinates of the resized calibration image, thereby constructing a resized first image having an instantaneous field of view (IFoV) corresponding to an IFOV of a second image of the scene; and
registering the first image to the second image captured by a second camera without information about features of the first image and without processing the second image.

9. The method of claim 8, wherein the first calibration image
is distortion-corrected, whereby the resized first image is distortion-corrected.

10. The method of claim 9, further comprising:
for the corresponding respective pixel coordinates of the distortion-corrected, resized first calibration image, determining corresponding respective pixel coordinates of the distortion-corrected, resized first image; and
from the corresponding respective pixel coordinates of the distortion-corrected, resized first image, copying pixel intensity values to the respective pixel coordinates of the resampled, distortion-corrected, resized first calibration image, thereby constructing a resampled, distortion-corrected, resized first image registered to the second image.

11. The method of claim 9, further comprising:
rectifying the distortion-corrected, resized first image to provide a rectified, distortion-corrected, resized first image;

warping the rectified, distortion-corrected, resized first image to provide a warped, rectified, distortion-corrected, resized first image; and inverse rectifying the warped, rectified, distortion-corrected, resized first image, thereby constructing the resampled, distortion-corrected, resized first image.

12. The method of claim 11, further comprising: constructing the rectified, distortion-corrected, resized first image by copying respective pixel intensity values from corresponding respective Cartesian coordinates of the distortion-corrected, resized first image, to corresponding respective polar pixel coordinates of a rectified, distortion-corrected, resized first calibration image.

13. The method of claim 12, further comprising: constructing the warped, rectified, distortion-corrected, resized first image by copying pixel intensity values from respective pixel coordinates of the rectified, distortion-corrected, resized first image to corresponding respective pixel coordinates of a warped, rectified, distortion-corrected resized first calibration image.

14. The method of claim 13, further comprising: constructing the resampled, distortion-corrected, resized first image by copying pixel intensity values of the warped, rectified, distortion-corrected, resized first image, to corresponding respective pixel coordinates of a resampled, distortion-corrected, resized first calibration image.

15. The method of claim 8, further comprising:

constructing a resized first image having an instantaneous field of view (IFoV) corresponding to an IFOV of the second image;

constructing a distortion-corrected, resized first image; and constructing a resampled, distortion-corrected, resized first image to provide a resampled, distortion-corrected, resized first image comprising the first image registered to the second image.

* * * * *